(12) United States Patent
Oxenkrug et al.

(10) Patent No.: US 12,527,754 B2
(45) Date of Patent: Jan. 20, 2026

(54) METHODS AND COMPOSITIONS FOR PREVENTING AND TREATING METABOLIC SYNDROME INDUCED BY ANTIPSYCHOTIC TREATMENT AND RELATED DISEASES AND CONDITIONS

(71) Applicant: Tufts Medical Center, Inc., Boston, MA (US)

(72) Inventors: Gregory Oxenkrug, Newton, MA (US); Paul Summergrad, Boston, MA (US)

(73) Assignee: Tufts Medical Center, Inc., Boston, MA (US)

( * ) Notice: Subject to any disclaimer, the term of this patent is extended or adjusted under 35 U.S.C. 154(b) by 1009 days.

(21) Appl. No.: 17/256,321

(22) PCT Filed: Jun. 28, 2019

(86) PCT No.: PCT/US2019/039747
§ 371 (c)(1),
(2) Date: Dec. 28, 2020

(87) PCT Pub. No.: WO2020/006367
PCT Pub. Date: Jan. 2, 2020

(65) Prior Publication Data
US 2021/0220298 A1    Jul. 22, 2021

Related U.S. Application Data

(60) Provisional application No. 62/692,089, filed on Jun. 29, 2018.

(51) Int. Cl.
| | |
|---|---|
| A61K 31/165 | (2006.01) |
| A61K 31/155 | (2006.01) |
| A61K 31/198 | (2006.01) |
| A61K 31/38 | (2006.01) |
| A61K 31/382 | (2006.01) |
| A61K 31/4439 | (2006.01) |
| A61K 31/454 | (2006.01) |
| A61K 31/496 | (2006.01) |
| A61K 31/50 | (2006.01) |
| A61K 31/5025 | (2006.01) |
| A61K 31/513 | (2006.01) |
| A61K 31/522 | (2006.01) |
| A61K 31/5415 | (2006.01) |
| A61K 31/542 | (2006.01) |
| A61K 31/5513 | (2006.01) |
| A61K 31/554 | (2006.01) |
| A61K 31/64 | (2006.01) |
| A61K 31/7042 | (2006.01) |
| A61K 31/7048 | (2006.01) |
| A61K 38/26 | (2006.01) |
| A61P 3/06 | (2006.01) |
| A61P 3/10 | (2006.01) |

(52) U.S. Cl.
CPC .......... *A61K 31/165* (2013.01); *A61K 31/155* (2013.01); *A61K 31/198* (2013.01); *A61K 31/38* (2013.01); *A61K 31/382* (2013.01); *A61K 31/4439* (2013.01); *A61K 31/454* (2013.01); *A61K 31/496* (2013.01); *A61K 31/50* (2013.01); *A61K 31/5025* (2013.01); *A61K 31/513* (2013.01); *A61K 31/522* (2013.01); *A61K 31/5415* (2013.01); *A61K 31/542* (2013.01); *A61K 31/5513* (2013.01); *A61K 31/554* (2013.01); *A61K 31/64* (2013.01); *A61K 31/7042* (2013.01); *A61K 31/7048* (2013.01); *A61K 38/26* (2013.01); *A61P 3/06* (2018.01); *A61P 3/10* (2018.01)

(58) Field of Classification Search
CPC .. A61K 31/165; A61K 31/5025; A61K 31/50; A61K 31/7042; A61P 3/10
See application file for complete search history.

(56) References Cited

U.S. PATENT DOCUMENTS

| | | | |
|---|---|---|---|
| 6,207,699 B1 | 3/2001 | Rothman | |
| 8,778,960 B2 | 7/2014 | Deaver et al. | |
| 2004/0204401 A1 | 10/2004 | Migaly | |
| 2009/0124559 A1* | 5/2009 | Bachovchin | A61K 31/69 548/518 |
| 2010/0311719 A1 | 12/2010 | Nagy et al. | |

FOREIGN PATENT DOCUMENTS

WO    WO-2006105440 A2 * 10/2006    ......... A61K 31/4436

OTHER PUBLICATIONS

Del Campo et al. Metabolic Syndrome and Antipsychotics: The Role of Mitochondrial Fission/Fusion Imbalance, (Frontiers in Endocrinology vol. 9), Apr. 2018, pp. 1-7, [online], [retrieved on Dec. 12, 2023]. Retrieved from the internet <URL: https://www.frontiersin.org/articles/10.3389/fendo.2018.00144 (Year: 2018).*

Ma et al., Effective treatment with combination of peripheral 5-hydroxytryptamine synthetic inhibitor and 5-hydroxytryptamine 2 receptor antagonist on glucocorticoid-induced whole-body insulin resistance with hyperglycemia, JDI, Nov. 2016, pp. 833-844 (Year: 2016).*

Oxenkrug, Insulin resistance and dysregulation of tryptophan â kynurenine and kynurenine â nicotinamide adenine dinucleotide metabolic pathways, Mol Neurobiology, Oct. 2013, pp. 294-301. (Year: 2013).*

Of Del Campo et al. Metabolic Syndrome and Antipsychotics: The Role of Mitochondrial Fission/Fusion Imbalance, (Frontiers in Endocrinology vol. 9), Apr. 2018, pp. 1-7 (Year: 2018).*

(Continued)

*Primary Examiner* — Sarah Pihonak
*Assistant Examiner* — Mikhail O'Donnel Robinson
(74) *Attorney, Agent, or Firm* — Clark & Elbing LLP

(57) ABSTRACT

The invention provides methods and compositions for use in the prevention and treatment of antipsychotic medication-induced metabolic syndrome (MetS) and diseases and conditions related to MetS.

31 Claims, 1 Drawing Sheet

(56) References Cited

OTHER PUBLICATIONS

Del Campo et al. Metabolic Syndrome and Antipsychotics: The Role of Mitochondrial Fission/Fusion Imbalance, (Frontiers in Endocrinology vol. 9), Apr. 2018, pp. 1-7. (Year: 2018).*

International Preliminary Report on Patentability mailed Jan. 7, 2021 for for PCT International Application No. PCT/2019/039747, Oxenkrug et al., "Methods and Compositions for Preventing and Treating Metabolic Syndrome Induced by Antipsychotic Treatment and Related Diseases and Conditions", filed Jun. 29, 2019 (7 pages).

Badawy et al., "Kynurenine pathway of tryptophan metabolism: regulatory and functional aspects," Int. J. Tryptophan Res. 10:1-20 (2017).

Bender, "Inhibition in vitro of the enzymes of the oxidative pathway of tryptophan metabolism and of nicotinamide nucleotide synthesis by benserazide, carbidopa and isoniazid," Biochem. Pharmacol. 29(5):707-712 (1980).

International Search Report and Written Opinion mailed Sep. 16, 2019 for PCT International Application No. PCT/2019/039747, Oxenkrug et al., "Methods and Compositions for Preventing and Treating Metabolic Syndrome Induced by Antipsychotic Treatment and Related Diseases and Conditions," filed Jun. 28, 2019 (11 pages).

Scigliano et al., "Antipsychotic-induced metabolic and cardiovascular side effects in schizophrenia: a novel mechanistic hypothesis," CNS Drugs 27(4):249-257 (2013).

Albaugh et al., "A double blind, placebo-controlled, randomized crossover study of the acute metabolic effects of olanzapine in healthy volunteers," PLoS One.6(8):e22662 (Aug. 2011) (9 pages).

Chintoh et al., "Insulin resistance and decreased glucose-stimulated insulin secretion after acute olanzapine administration," J Clin Psychopharmacol. 28(5):494-9 (Oct. 2008).

Oxenkrug et al., "Peripheral kynurenine-3-monooxygenase deficiency as a potential risk factor for metabolic syndrome in schizophrenia patients," Integr Clin Med. 1(1):10.15761/ICM.1000105 (May 2017) (3 pages).

Oxenkrug, "Metabolic syndrome, age-associated neuroendocrine disorders, and dysregulation of tryptophan-kynurenine metabolism," Ann N Y Acad Sci. 1199:1-14 (Jun. 2010).

Freyberg et al., "Intrinsic and Antipsychotic Drug-Induced Metabolic Dysfunction in Schizophrenia," Front Neurosci. 11:432 (Jul. 2017) (13 pages).

Henderson et al., "A double-blind, placebo-controlled trial of rosiglitazone for clozapine-induced glucose metabolism impairment in patients with schizophrenia," available in PMC Jan. 15, 2025, published in final edited form as: Acta Psychiatr Scand. 119(6):457-65 (Jun. 2009) (17 pages).

Holt, "Association Between Antipsychotic Medication Use and Diabetes," Curr Diab Rep. 19(10):96 (Sep. 2019) (10 pages).

Jarskog et al., "Metformin for weight loss and metabolic control in overweight outpatients with schizophrenia and schizoaffective disorder," Am J Psychiatry. 170(9):1032-40 (Sep. 2013).

Oxenkrug et al., "Benserazide, an Inhibitor of Peripheral Kynurenine Metabolism, Attenuates Olanzapine-Induced Weight Gain, Insulin Resistance, and Dyslipidemia in C57Bl/6j Mice," Mol Neurobiol. 57(1):135-8 (Epub Sep. 2019).

Rado et al., "A Naturalistic Randomized Placebo-Controlled Trial of Extended-Release Metformin to Prevent Weight Gain Associated With Olanzapine in a US Community-Dwelling Population," J Clin Psychopharmacol. 36(2):163-8 (Apr. 2016) (abstract only) (2 pages).

Rampello et al., "Psychotic complications of long term levodopa treatment of Parkinson's disease," Arch Gerontol Geriatr. 22 Suppl 1:63-7 (1996) (abstract only) (4 pages).

Akinola et al., "Antipsychotic-Induced Metabolic Syndrome: a Review," Metab Syndr Relat Disord. 21(6):294-305 (Epub Jun. 2023) (Aug. 2023) (abstract only) (1 page).

Citrome et al., "Weight gain and changes in metabolic variables following olanzapine treatment in schizophrenia and bipolar disorder," Clin Drug Investig. 31(7):455-82 (2011).

Pilinger et al., "Comparative effects of 18 antipsychotics on metabolic function in patients with schizophrenia, predictors of metabolic dysregulation, and association with psychopathology: a systematic review and network meta-analysis," Lancet Psychiatry. 7(1):64-77 (Epub Dec. 2019) (Jan. 2020).

Spelman et al., "Impaired glucose tolerance in first-episode drug-naïve patients with schizophrenia," Diabet Med. 24(5):481-5 (Epub Mar. 2007) (May 2007) (19 pages).

* cited by examiner

METHODS AND COMPOSITIONS FOR PREVENTING AND TREATING METABOLIC SYNDROME INDUCED BY ANTIPSYCHOTIC TREATMENT AND RELATED DISEASES AND CONDITIONS

FIELD OF THE INVENTION

The invention relates to methods and compositions for use in the prevention and treatment of metabolic syndrome induced by antipsychotic treatment and related diseases and conditions.

BACKGROUND OF THE INVENTION

Metabolic syndrome (MetS) is characterized by a cluster of conditions that occur together, including hypertension, insulin resistance, obesity, and dyslipidemia. Having MetS increases one's risk of developing serious medical conditions such as heart disease, stroke, and type 2 diabetes. The incidence of MetS has continued to rise in recent years due to factors including increased prevalence of sedentary lifestyles and poor eating habits. MetS is also associated with chronic inflammation and aging. In addition to these causes, the development of MetS is also associated with antipsychotic drug treatment. In particular, MetS is a very serious side-effect of antipsychotic medications: it decreases compliance with treatment, impairs cognitive functioning, and increases morbidity (e.g., cardiovascular disease, type 2 diabetes, morbid obesity, atherosclerosis, and hypertension) and mortality (life span of patients having schizophrenia is 28 year shorter than that of the general population). MetS represents a serious public health concern. Approaches for preventing and treating MetS are needed.

In humans, metabolism of the essential amino acid tryptophan (Trp), via the kynurenine pathway (KP), is the main source of nicotinamide adenine dinucleotide ($NAD^+$), a coenzyme found in all living cells participating in many oxidation-reduction reactions (disruption of KP is one of the causes of disease pellagra which, if untreated, leads to death within four or five years). Both in the central nervous system, i.e., in brain astro- and micro-glial cells, and in peripheral tissues, e.g., liver, pancreas, kidney, macrophages, and fatty tissues, the KP is initiated by Trp conversion into Kyn, catalyzed by either Trp- or indoleamine-2,3-dioxygenases (TDO and IDO, resp.) (FIG. 1A). Up-regulation of Trp conversion into Kyn is one of the general (unspecific) responses of the body to stress (via TDO) and inflammation (via IDO). Further, downstream, metabolism of Kyn is trifurcated into the formation of 3-hydroxyKyn (3HK), kynurenic (KYNA), and anthranilic (ANA) acids. Some peripheral Kyn metabolites are able to cross the blood-brain barrier (BBB) (e.g., 60% of brain Kyn is of peripheral origin), but others, e.g., KYNA, do not cross the BBB. Kynurenine-3-monooxygenase (KMO) catalyzes the formation of 3HK (and, eventually, $NAD^+$); kynurenine aminotransferase (KAT) catalyzes production of KYNA, and kynureninase (Kynu) catalyzes formation of ANA from Kyn (FIG. 1B). Under physiological conditions, the availability of Kyn as a substrate for KYNA and ANA formation depends upon KMO activity, because KAT and Kynu are unsaturated enzymes (FIG. 1B). KMO deficiency results in decreased formation of 3HK and increased production of KYNA and ANA, a so-called shift of Kyn downstream metabolism from formation of 3HK toward production of KYNA and ANA (FIG. 2).

SUMMARY OF THE INVENTION

The invention provides methods for preventing or treating metabolic syndrome induced by an anti-psychotic medication in a subject (e.g., a human patient) in need thereof. The methods include administering to the subject:

(a) a compound of Formula I:

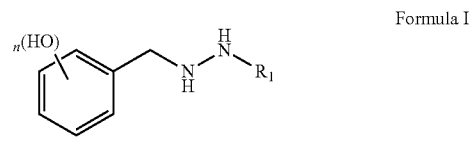

Formula I or a pharmaceutically-acceptable salt thereof, wherein $R_1$ is selected from the group consisting of hydrogen and amino-substituted acyl, and n is a whole integer from 2 to 3; or (b) a compound of Formula II:

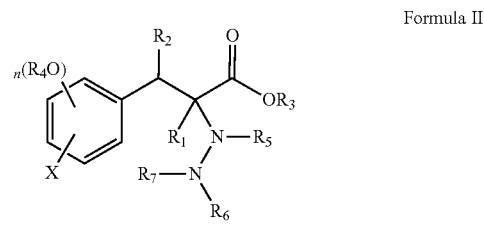

Formula II or a pharmaceutically-acceptable salt thereof, wherein $R_1$, $R_2$, and $R_3$ are each independently hydrogen or lower alkyl, $R_4$ and $R_5$ are independently hydrogen or lower alkanoyl, $R_6$ is hydrogen, lower alkanoyl, lower alkyl, or together with $R_7$ lower alkylidenyl, $R_7$ is hydrogen, lower alkyl, or together with $R_6$ lower alkylidenyl; n is a whole integer from 0 to 3, and X is selected from the group consisting of hydrogen, alkyl, halogen, and trifluoromethyl, X being para to the acidic side chain when other than hydrogen.

In some embodiments, the compound is L-benserazide (S-enantiomer). In some embodiments, the compound is D,L-benserazide (R,S-enantiomers). In some embodiments, the compound is D-benserazide (R-enantiomer). In some embodiments, the compound is of Formula II and is selected from the S enantiomer, the R enantiomer, and a racemic mixture of the compound.

The invention also provides methods of preventing the onset of a disease or condition associated with dysregulation of the kynurenine pathway of tryptophan metabolism in a subject (e.g., a human patient) in need thereof. These methods include administering to the subject a compound of Formula I or Formula II, as set forth above, or a pharmaceutically acceptable salt thereof. In some embodiments, the disease or condition associated with dysregulation of the kynurenine pathway of tryptophan metabolism is selected from the group consisting of pre-diabetes; type II diabetes; obesity; chronic, low-grade, sub-clinical Th1-type inflammation; cardiovascular disease; stroke; major depressive disorder; schizophrenia;

bipolar disorder; Alzheimer's type dementia; and aging-associated metabolic syndrome. In further embodiments, the compound of Formula I or Formula II is administered in combination with one or more additional therapy for the disease or condition. In some embodiments, the compound is L-benserazide (S-enantiomer). In some embodiments, the compound is D,L-benserazide (R,S-enantiomers). In some embodiments, the compound is D-benserazide (R-enantiomer).

The invention additional provides methods of decreasing morbidity or mortality in a subject (e.g., a human patient) treated with an anti-psychotic drug. These methods include administering to the subject a compound of Formula I or Formula II, as set forth above, or a pharmaceutically acceptable salt thereof. In some embodiments, the compound is L-benserazide (S-enantiomer). In some embodiments, the compound is D,L-benserazide (R,S-enantiomers). In some embodiments, the compound is D-benserazide (R-enantiomer).

In various embodiments of the methods described above and elsewhere herein, the compound of Formula I or Formula II is administered in a form selected from the group consisting of a tablet, a capsule, nanoparticles, and liposomes.

In various embodiments of the methods described above and elsewhere herein, the compound is of Formula I and $R_1$ is an alpha-amino acyl or a beta-amino acyl (e.g., $R_1$ is an amino-lower alkanoyl or a hydroxy-substituted amino-lower alkanoyl; e.g., $R_1$ is selected from seryl, threonyl, alanyl, and beta-amino-propionyl)

In various embodiments of the methods described above and elsewhere herein, the compound is of Formula I and is selected from the group consisting of seryl-(3,4-dihydroxylbenzyl)-hydrazide, seryl-(2,3,4-trihydroxybenzyl)-hydrazide, threonyl-(2,3,4-trihydroxybenzyl))-hydrazide, alanyl-(2,3,4-trihydroxybenzyl)-hydrazide, and 2,3,4-trihydroxybenzyl-hydrazine. In some embodiments, the compound is L-benserazide (S-enantiomer). In some embodiments, the compound is D,L-benserazide (R,S-enantiomers). In some embodiments, the compound is D-benserazide (R-enantiomer).

In various embodiments of the methods described above and elsewhere herein, the compound is of Formula II and is selected from the group consisting of α-hydrazino-β-phenylpropionic acid; α-hydrazino-α-methyl-β-phenylpropionic acid; α-hydrazino-β-3-hydroxyphenylpropionic acid; α-hydrazino-α-methyl-β-3-hydroxyphenylpropionic acid; α-hydrazino-α-methyl-β-4-hydroxyphenylpropionic acid; α-hydrazino-β-3,4-dihydroxyphenylpropionic acid; α-hydrazino-α-methyl-β-3,4-dihydroxyphenylpropionic acid; α-hydrazino-α-methyl-β-2,3-dihydroxyphenylpropionic acid; α-hydrazino-α-methyl-β-2,4-dihydroxyphenylpropionic acid; α-hydrazino-α-methyl-β-3-hydroxy-4-methylphenylpropionic acid; α-hydrazino-α-methyl-β-3-hydroxy-4-chlorophenylpropionic acid; α-hydrazino-α-methyl-β-3-hydroxy-4-bromophenylpropionic acid; α-hydrazino-α-methyl-β-3-hydroxy-4-fluorophenylpropionic acid; α-hydrazino-α-methyl-β-3-hydroxy-4-trifluoromethylpropionic acid; α-hydrazino-α-methyl-β-3-hydroxy-4-ethylphenylpropionic acid; α-hydrazino-α-methyl-β-2,5-dihydroxyphenylpropionic acid; α-hydrazino-α-methyl-β-3,4,5-trihydroxyphenylpropionic acid; α-hydrazino-α-methyl-β-2,4,5-trihydroxyphenylpropionic acid; α-hydrazino-α-methyl-β-2,3,4-trihydroxyphenylpropionic acid; α-hydrazino-α-ethyl-β-3-hydroxyphenylpropionic acid; α-hydrazino-α-ethyl-β-4-hydroxyphenylpropionic acid; α-hydrazino-α-ethyl-β-3,4-hydroxyphenylpropionic acid; α-hydrazino-α-ethyl-β-2,3-dihydroxyphenylpropionic acid; α-hydrazino-α-ethyl-β-2,5-dihydroxyphenylpropionic acid; α-hydrazino-α-ethyl-β-2,4-dihydroxyphenylpropionic acid; α-hydrazino-α-ethyl-β-3,4,5-trihydroxyphenylpropionic acid; α-hydrazino-α-ethyl-β-2,4,5-trihydroxyphenylpropionic acid; α-hydrazino-α-ethyl-β-2,3,4-trihydroxyphenylpropionic acid; α-hydrazino-α-propyl-β-3-hydroxyphenylpropionic acid; α-hydrazino-α-propyl-β-4-hydroxyphenylpropionic acid; α-hydrazino-α-propyl-β-3,4-hydroxyphenylpropionic acid; α-hydrazino-α-propyl-β-2,3-dihydroxyphenylpropionic acid; α-hydrazino-α-propyl-β-2,4-dihydroxyphenylpropionic acid; α-hydrazino-α-propyl-β-2,5-dihydroxyphenylpropionic acid; α-hydrazino-α-propyl-β-3,4,5-trihydroxyphenylpropionic acid; α-hydrazino-α-propyl-β-2,4,5-trihydroxyphenylpropionic acid; α-hydrazino-α-propyl-β-2,3,4-trihydroxyphenylpropionic acid; α-hydrazino-α-butyl-β-3-hydroxyphenylpropionic acid; α-hydrazino-α-butyl-β-4-hydroxyphenylpropionic acid; α-hydrazino-α-butyl-β-3,4-hydroxyphenylpropionic acid; α-hydrazino-α-butyl-β-2,3-dihydroxyphenylpropionic acid; α-hydrazino-α-butyl-β-2,4-dihydroxyphenylpropionic acid; α-hydrazino-α-butyl-β-2,5-dihydroxyphenylpropionic acid; α-hydrazino-α-butyl-β-3,4,5-trihydroxyphenylpropionic acid; α-hydrazino-α-butyl-β-2,4,5-trihydroxyphenylpropionic acid; α-hydrazino-α-butyl-β-2,3,4-trihydroxyphenylpropionic acid; α-hydrazino-α-β-dimethyl-β-3-hydroxyphenylpropionic acid; α-hydrazino-α,β-dimethyl-β-4-hydroxyphenylpropionic acid; α-hydrazino-α,β-dimethyl-β-3,4-hydroxyphenylpropionic acid; α-hydrazino-α-β-dimethyl-β-2,3-dihydroxyphenylpropionic acid; α-hydrazino-α,β-dimethyl-β-2,4-dihydroxyphenylpropionic acid; α-hydrazino-α,β-dimethyl-β-2,5-dihydroxyphenylpropionic acid; α-hydrazino-α-β-dimethyl-β-3,4,5-trihydroxyphenylpropionic acid; α-hydrazino-α-β-dimethyl-β-2,4,5-trihydroxyphenylpropionic acid; α-hydrazino-α-β-dimethyl-β-2,3,4-trihydroxyphenylpropionic acid; α-hydrazino-α-ethyl-β-methyl-β-3-hydroxyphenylpropionic acid; α-hydrazino-α-ethyl-β-methyl-β-4-hydroxyphenylpropionic acid; α-hydrazino-α-ethyl-β-methyl-β-3,4-hydroxyphenylpropionic acid; α-hydrazino-α-ethyl-β-methyl-β-2,3-dihydroxyphenylpropionic acid; α-hydrazino-α-ethyl-β-methyl-β-2,4-dihydroxyphenylpropionic acid; α-hydrazino-α-ethyl-β-methyl-β-2,5-dihydroxyphenylpropionic acid; α-hydrazino-α-ethyl-β-methyl-3,4,5-trihydroxyphenylpropionic acid; α-hydrazino-α-ethyl-β-methyl-β-2,4,5-trihydroxyphenylpropionic acid; α-hydrazino-α-ethyl-β-methyl-β-2,3,4-trihydroxyphenylpropionic acid; α-hydrazino-α-methyl-β-ethyl-β-3-hydroxyphenylpropionic acid; α-hydrazino-α-methyl-β-ethyl-β-4-hydroxyphenylpropionic acid; α-hydrazino-α-methyl-β-ethyl-β-3,4-hydroxyphenylpropionic acid; α-hydrazino-α-methyl-β-ethyl-β-2,3-dihydroxyphenylpropionic acid; α-hydrazino-α-methyl-β-ethyl-β-2,5-dihydroxyphenylpropionic acid; α-hydrazino-α-methyl-β-ethyl-β-3,4,5-trihydroxyphenylpropionic acid; α-hydrazino-α-methyl-β-ethyl-β-2,4,5-trihydroxyphenylpropionic acid; $N^2$-isopropylidenyl-α-hydrazino-α-methyl-β-(3,4-dihydroxyphenyl) propionic acid; $N^2$-isopropyl-α-hydrazino-α-methyl-β-(3,4-dihydroxyphenyl) propionic acid; α-hydrazino-α-methyl-β-3,4-dihydroxyphenylpropionic acid ethyl ester; α-hydrazino-α-methyl-β-3,4-dihydroxyphenylpropionic acid ethyl ester; α-hydrazino-α-methyl-β-3,4-dihydroxyphenylpropionic acid ethyl ester hydrochloride; α-hydrazino-α-ethyl-β-3,4-dihydroxyphenylpropionic acid; α-hydrazino-α,β-dimethyl-β-3,4-dihydroxyphenylpropionic acid; α-hydrazino-β-(3,4-dihydroxyphenyl) propionic acid; α-hydrazino-β-(3-hydroxyphenyl) propionic acid; and α-hydrazino-β-(4-hydroxyphenyl) propionic acid.

In various embodiments of the methods described above and elsewhere herein, the compound is of Formula II and is α-hydrazino-α-methyl-β-2,4-dihydroxyphenylpropionic acid (carbidopa).

In various embodiments of the methods described above and elsewhere herein, the compound of Formula I or the compound of Formula II is present in the same composition as an anti-psychotic drug when administered to the subject.

In various embodiments of the methods described above and elsewhere herein, the aspect of metabolic syndrome to be prevented or treated is selected from the group consisting of high blood pressure, high blood sugar, insulin resistance, excess body fat around the waist, and dyslipidemia.

In various embodiments of the methods described above and elsewhere herein, the feature of dyslipidemia to be prevented or treated is selected from the group consisting of high cholesterol levels, high serum triglyceride levels, and low high-density lipoprotein levels.

In various embodiments of the methods described above and elsewhere herein, the subject is under treatment with: (a) an atypical anti-psychotic drug, optionally selected from the group consisting of a benzamide (e.g., amisulpride, nemonapride, remoxipride, and sultopride), benzisoxazole/benzisothiazole (e.g., iloperidone, lurasicone, paliperidone, paliperidone palmitate, perospirone, risperidone, and ziprasidone), butyrophenone (e.g., melperone), phenylpiperazine/quinolinone (e.g., aripiprazole, aripiprazole lauroxil, brexpiprazole, and cariprazine), and tricyclic (e.g., asenapin, clozapine, olanzapine, quetiapine, and zotepine); or (b) a typical anti-psychotic, optionally selected from the group consisting of a butyrophenone (e.g., benperidol, bromperidol, droperidol, haloperidol, and timiperone), diphenylbutylpiperidine (e.g., fluspirilene, penfluridol, and pimozide), phenothiazine (e.g., chlorpromazine, cyamemazine, dixyrazine, fluphenazine, levomepromazine, perazine, pericyazine, perphenazine, pipotiazine, prochlorperazine, promethazine, prothipendyl, thioproperazine, and trifluoperazine), and thioxanthene (e.g., chlorprothixene, clopenthixol, flupentixol, thiothixene, and zuclopenthixol).

In various embodiments of the methods described above and elsewhere herein, the subject has or is at risk of developing schizophrenia, schizoaffective disorder, bipolar disorder, psychotic depression, treatment-resistant depression, or other conditions requiring administration of an anti-psychotic drug. In some embodiments, the subject is selected for treatment based on their having or being at risk of one or more of said diseases or conditions.

In various embodiments of the methods described above and elsewhere herein, the methods further include administration of an antidiabetic drug to the subject. In various examples, the antidiabetic drug is selected from the group consisting of a biguanide, dopamine agonist, DPP-4 inhibitor, glucagon-like peptide, meglitinide, sodium glucose transporter (SGLT) 2 inhibitor, sulfonylurea, and thiazolidinedione, and combinations thereof. In specific examples, the antidiabetic drug can be selected from the group consisting of metformin, bromocriptine, alogliptin, linagliptin, saxagliptin, sitagliptin, albiglutide, dulaglutide, exenatide, exenitide extended-release, liragludite, nateglinide, repaglinide, dapagliflozin, canagliflozin, empagliflozin, glimepiride, gliclazide, glipizide, glyburide, chlorpropamide, tolazamide, tolbutamide, rosiglitazone, and pioglitazone. In various embodiments, the compound of Formula I or the compound of Formula II is present in the same composition as the antidiabetic drug when administered to the subject.

The invention also provides pharmaceutical compositions including a compound of Formula I or a compound of Formula II, as set forth above, or a pharmaceutically acceptable salt thereof, and an antipsychotic drug. The invention also provides kits including one or more pharmaceutical composition as described herein, optionally in combination with one or more additional therapeutic agents and/or directions for use.

In various embodiments of the pharmaceutical compositions of the invention, the compound of Formula I is selected from the group consisting of seryl-(3,4-dihydroxylbenzyl)-hydrazide, seryl-(2,3,4-trihydroxybenzyl)-hydrazide, threonyl-(2,3,4-trihydroxybenzyl))-hydrazide, alanyl-(2,3,4-trihydroxybenzyl)-hydrazide, and 2,3,4-trihydroxybenzylhydrazine.

In various embodiments of the pharmaceutical compositions of the invention, the compound of Formula II is selected from the group consisting of α-hydrazino-β-phenylpropionic acid; α-hydrazino-α-methyl-β-phenylpropionic acid; α-hydrazino-β-3-hydroxyphenylpropionic acid; α-hydrazino-α-methyl-β-3-hydroxyphenylpropionic acid; α-hydrazino-α-methyl-β-4-hydroxyphenylpropionic acid; α-hydrazino-β-3,4-dihydroxyphenylpropionic acid; α-hydrazino-α-methyl-β-3,4-dihydroxyphenylpropionic acid; α-hydrazino-α-methyl-β-2,3-dihydroxyphenylpropionic acid; α-hydrazino-α-methyl-β-2,4-dihydroxyphenylpropionic acid; α-hydrazino-α-methyl-β-3-hydroxy-4-methylphenylpropionic acid; α-hydrazino-α-methyl-β-3-hydroxy-4-chlorophenylpropionic acid; α-hydrazino-α-methyl-β-3-hydroxy-4-bromophenylpropionic acid; α-hydrazino-α-methyl-β-3-hydroxy-4-fluorophenylpropionic acid; α-hydrazino-α-methyl-β-3-hydroxy-4-trifluoromethylpropionic acid; α-hydrazino-α-methyl-β-3-hydroxy-4-ethylphenylpropionic acid; α-hydrazino-α-methyl-β-2,5-dihydroxyphenylpropionic acid; α-hydrazino-α-methyl-β-3,4,5-trihydroxyphenylpropionic acid; α-hydrazino-α-methyl-β-2,4,5-trihydroxyphenylpropionic acid; α-hydrazino-α-methyl-β-2,3,4-trihydroxyphenylpropionic acid; α-hydrazino-α-ethyl-β-3-hydroxyphenylpropionic acid; α-hydrazino-α-ethyl-β-4-hydroxyphenylpropionic acid; α-hydrazino-α-ethyl-β-3,4-hydroxyphenylpropionic acid; α-hydrazino-α-ethyl-β-2,3-dihydroxyphenylpropionic acid; α-hydrazino-α-ethyl-β-2,5-dihydroxyphenylpropionic acid; α-hydrazino-α-ethyl-β-2,4-dihydroxyphenylpropionic acid; α-hydrazino-α-ethyl-β-3,4,5-trihydroxyphenylpropionic acid; α-hydrazino-α-ethyl-β-2,4,5-trihydroxyphenylpropionic acid; α-hydrazino-α-ethyl-β-2,3,4-trihydroxyphenylpropionic acid; α-hydrazino-α-propyl-β-3-hydroxyphenylpropionic acid; α-hydrazino-α-propyl-β-4-hydroxyphenylpropionic acid; α-hydrazino-α-propyl-β-3,4-hydroxyphenylpropionic acid; α-hydrazino-α-propyl-β-2,3-dihydroxyphenylpropionic acid; α-hydrazino-α-propyl-β-2,4-dihydroxyphenylpropionic acid; α-hydrazino-α-propyl-β-2,5-dihydroxyphenylpropionic acid; α-hydrazino-α-propyl-β-3,4,5-trihydroxyphenylpropionic acid; α-hydrazino-α-propyl-β-2,4,5-trihydroxyphenylpropionic acid; α-hydrazino-α-propyl-β-2,3,4-trihydroxyphenylpropionic acid; α-hydrazino-α-butyl-β-3-hydroxyphenylpropionic acid; α-hydrazino-α-butyl-β-4-hydroxyphenylpropionic acid; α-hydrazino-α-butyl-β-3,4-hydroxyphenylpropionic acid; α-hydrazino-α-butyl-β-2,3-dihydroxyphenylpropionic acid; α-hydrazino-α-butyl-β-2,4-dihydroxyphenylpropionic acid; α-hydrazino-α-butyl-β-2,5-dihydroxyphenylpropionic acid; α-hydrazino-α-butyl-β-3,4,5-trihydroxyphenylpropionic acid; α-hydrazino-α-butyl-β-2,4,5-trihydroxyphenylpropionic acid; α-hydrazino-α-butyl-β-2,3,4-trihydroxyphenylpropionic acid; α-hydrazino-α-β-dimethyl-β-3-hydroxyphenylpropionic acid; α-hydrazino-α,β-dimethyl-β-4-hydroxyphenylpropionic acid; α-hydrazino-α,β-dimethyl-β-3,4-hydroxyphenylpropionic acid; α-hydrazino-α-β-dimethyl-β-2,3-dihydroxyphenylpropionic acid; α-hydrazino-α,β-dimethyl-β-2,4-dihydroxyphenylpropionic acid; α-hydrazino-α,β-dimethyl-β-2,5-dihydroxyphenylpropionic acid; α-hydrazino-α-β-dimethyl-β-3,4,5-trihydroxyphenylpropionic acid; α-hydrazino-α-β-dimethyl-β-2,4,5-trihydroxyphenylpropionic acid; α-hydrazino-α-β-dimethyl-β-2,3,4-trihydroxyphenylpropionic acid; α-hydrazino-α-ethyl-β-methyl-β-3-hydroxyphenylpropionic acid; α-hydrazino-α-ethyl-β-methyl-β-4-hydroxyphenylpropionic acid; α-hydrazino-α-ethyl-β-methyl-β-3,4-hydroxyphenylpropionic acid; α-hydrazino-α-ethyl-β-methyl-β-2,3-dihydroxyphenylpropionic acid; α-hydrazino-α-ethyl-β-methyl-β-2,4-dihydroxyphenylpropionic acid; α-hydrazino-α-ethyl-β-methyl-β-2,5-dihydroxyphenylpropionic acid; α-hydrazino-α-ethyl-β-methyl-3,4,5-trihydroxyphenylpropionic acid; α-hydrazino-α-ethyl-β-methyl-β-2,4,5-trihydroxyphenylpropionic acid; α-hydrazino-α-ethyl-β-methyl-β-2,3,4-trihydroxyphenylpropionic acid; α-hydrazino-α-methyl-β-ethyl-β-3-hydroxyphenylpropionic acid; α-hydrazino-α-methyl-β-ethyl-β-4-hydroxyphenylpropionic acid; α-hydrazino-α-methyl-β-ethyl-β-3,4-hydroxyphenylpropionic acid; α-hydrazino-α-methyl-β-ethyl-β-2,3-dihydroxyphenylpropionic acid; α-hydrazino-α-methyl-β-ethyl-β-2,5-dihydroxyphenylpropionic acid; α-hydrazino-α-methyl-β-ethyl-β-3,4,5-trihydroxyphenylpropionic acid; α-hydrazino-α-methyl-β-ethyl-β-2,4,5-trihydroxyphenylpropionic acid; $N^2$-isopropylidenyl-α-hydrazino-α-methyl-β-(3,4-dihydroxyphenyl) propionic acid; $N^2$-isopropyl-α-hydrazino-α-methyl-β-(3,4-dihydroxyphenyl) propionic acid; α-hydrazino-α-methyl-β-3,4-dihydroxyphenylpropionic acid ethyl ester; α-hydrazino-α-methyl-β-3,4-dihydroxyphenylpropionic acid ethyl ester; α-hydrazino-α-methyl-β-3,4-dihydroxyphenylpropionic acid ethyl ester hydrochloride; α-hydrazino-α-ethyl-β-3,4-dihydroxyphenylpropionic acid; α-hydrazino-α,β-dimethyl-β-3,4-dihydroxyphenylpropionic acid; α-hydrazino-β-(3,4-dihydroxyphenyl) propionic acid; α-hydrazino-β-(3-hydroxyphenyl) propionic acid; and α-hydrazino-β-(4-hydroxyphenyl) propionic acid.

In various embodiments of the pharmaceutical compositions of the invention, the compound of Formula I is seryl-(2,3,4-trihydroxybenzyl)-hydrazide (benserazide). In some embodiments, the compound is L-benserazide (S-enantiomer). In some embodiments, the compound is D,L-benserazide (R,S-enantiomers). In some embodiments, the compound is D-benserazide (R-enantiomer).

In various embodiments of the pharmaceutical compositions of the invention, the compound of Formula II is α-hydrazino-α-methyl-β-2,4-dihydroxyphenylpropionic acid (carbidopa).

In various embodiments of the pharmaceutical compositions of the invention, the antipsychotic drug is selected from: (a) an atypical anti-psychotic drug, optionally selected from the group consisting of a benzamide (e.g., amisulpride, nemonapride, remoxipride, and sultopride), benzisoxazole/benzisothiazole (e.g., iloperidone, lurasicone, paliperidone, paliperidone palmitate, perospirone, risperidone, and ziprasidone), butyrophenone (e.g., melperone), phenylpiperazine/quinolinone (e.g., aripiprazole, aripiprazole lauroxil, brexpiprazole, and cariprazine), and tricyclic (e.g., asenapin, clozapine, olanzapine, quetiapine, and zotepine); or (b) a typical anti-psychotic, optionally selected from the group consisting of a butyrophenone (e.g., benperidol, bromperidol, droperidol, haloperidol, and timiperone), diphenylbutylpiperidine (e.g., fluspirilene, penfluridol, and pimozide), phenothiazine (e.g., chlorpromazine, cyamemazine, dixyrazine, fluphenazine, levomepromazine, perazine, pericyazine, perphenazine, pipotiazine, prochlorperazine, promethazine, prothipendyl, thioproperazine, and trifluoperazine), and thioxanthene (e.g., chlorprothixene, clopenthixol, flupentixol, thiothixene, and zuclopenthixol).

In various embodiments of the pharmaceutical compositions of the invention, the composition is or is included within a tablet, capsule, nanoparticles, or liposomes.

In various embodiments of the pharmaceutical compositions of the invention, the pharmaceutical composition further includes an antidiabetic drug. In various examples, the antidiabetic drug is selected from the group consisting of a biguanide, dopamine agonist, DPP-4 inhibitor, glucagon-like peptide, meglitinide, sodium glucose transporter (SGLT) 2 inhibitor, sulfonylurea, and thiazolidinedione, and combinations thereof. In more specific examples, the antidiabetic drug is selected from the group consisting of metformin, bromocriptine, alogliptin, linagliptin, saxagliptin, sitagliptin, albiglutide, dulaglutide, exenatide, exenitide extended-release, liragludite, nateglinide, repaglinide, dapagliflozin, canagliflozin, empagliflozin, glimepiride, gliclazide, glipizide, glyburide, chlorpropamide, tolazamide, tolbutamide, rosiglitazone, and pioglitazone.

The invention also includes use of the compounds and compositions described herein for use in the prevention and treatment of the diseases and conditions described herein, as well as for use in the preparation of medicaments for such prevention and treatment.

Definitions

The term "acyl," as used herein, represents a chemical substituent of formula-C(O)—R, where R is alkyl, aryl, arylalkyl, cycloalkyl, heterocyclyl, heterocyclyl alkyl, heteroaryl, or heteroaryl alkyl. An optionally substituted acyl is an acyl that is optionally substituted as described herein for each group R.

The term "alkanoyl," as used herein, represents a chemical substituent of formula-C(O)—R, where R is alkyl. An optionally substituted alkanoyl is an alknanoyl that is optionally substituted as described herein for alkyl.

The term "alkyl," as used herein, refers to an acyclic straight or branched chain saturated hydrocarbon group which, when unsubstituted, has from 1 to 12 carbons, unless otherwise specified. In certain preferred embodiments, unsubstituted alkyl has from 1 to 6 carbons. Alkyl groups are exemplified by methyl; ethyl; n- and iso-propyl; n-, sec-, iso- and tert-butyl; neopentyl, and the like, and may be optionally substituted, valency permitting, with one, two, three, or, in the case of alkyl groups of two carbons or more, four or more substituents independently selected from the group consisting of: alkoxy; acyloxy; amino; aryl; aryloxy; azido; cycloalkyl; cycloalkoxy; halo; heterocyclyl; heteroaryl; heterocyclylalkyl; heteroarylalkyl; heterocyclyloxy; heteroaryloxy; hydroxy; nitro; thiol; silyl; cyano; =O; =S; and =NR', where R' is H, alkyl, aryl, or heterocyclyl. In some embodiments, two substituents combine to form a group -L-CO—R, where L is a bond or optionally substituted $C_{1-11}$ alkylene, and R is hydroxyl or alkoxy. Each of the substituents may itself be unsubstituted or, valency permitting, substituted with unsubstituted substituent(s) defined herein for each respective group.

The term "pharmaceutically acceptable," as used herein, refers to those compounds, materials, compositions, and/or dosage forms, which are suitable for contact with the tissues of an individual (e.g., a human), without excessive toxicity, irritation, allergic response and other problem complications commensurate with a reasonable benefit/risk ratio.

The phrase "pharmaceutically acceptable salt," as used herein, includes, for example, salts formed from an acid and a basic nitrogen group of, e.g., a compound as described herein. Examples of such salts include acid addition salts and base addition salts, such as inorganic acid salts or organic acid salts (e.g., hydrochloric acid salt, sulfuric acid salt, citrate, hydrobromic acid salt, hydroiodic acid salt, nitric acid salt, bisulfate, phosphoric acid salt, super phosphoric acid salt, isonicotinic acid salt, acetic acid salt, lactic acid salt, salicylic acid salt, tartaric acid salt, pantothenic acid salt, ascorbic acid salt, succinic acid salt, maleic acid salt, fumaric acid salt, gluconic acid salt, saccharinic acid salt, formic acid salt, benzoic acid salt, glutaminic acid salt, methanesulfonic acid salt, ethanesulfonic acid salt, benzenesulfonic acid salt, p-toluenesulfonic acid salt, pamoic acid salt (pamoate)), as well as salts of aluminum, calcium, lithium, magnesium, calcium, sodium, zinc, and diethanolamine.

The term "subject," as used herein, represents a human or non-human animal (e.g., a mammal) that is or is at risk of suffering from a disease or condition as described herein (e.g., MetS or a condition associated with a Th1-type inflammatory response), as determined by a qualified professional (e.g., a doctor or a nurse practitioner) with or without laboratory test(s) of sample(s) from the patient.

The term "treating" as used in reference to a disease or a condition in a patient, is intended to refer to obtaining beneficial or desired results, e.g., clinical results, in a patient by administering a compound or composition of the invention to the patient. Beneficial or desired results may include alleviation or amelioration of one or more symptoms of a disease or condition; diminishment of extent of a disease or condition; stabilization (i.e., not worsening) of a disease or condition; prevention of the spread of a disease or condition; delay or slowing the progress of a disease or condition; palliation of a disease or condition; and remission (whether partial or total). "Palliating" a disease or condition means that the extent and/or undesirable clinical manifestations of the disease or condition are lessened and/or time course of the progression is slowed, as compared to the extent or time course in the absence of the treatment with the compound of the invention.

Other features and advantages of the invention will be apparent from the following detailed description and the claims.

DETAILED DESCRIPTION

Figure 1A:
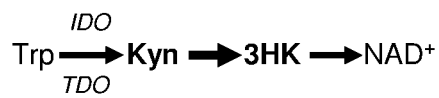
FIG. 1A and FIG. 1B illustrate KP in healthy subjects.
Figure 1B:
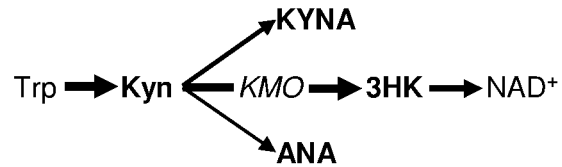
Figure 2:
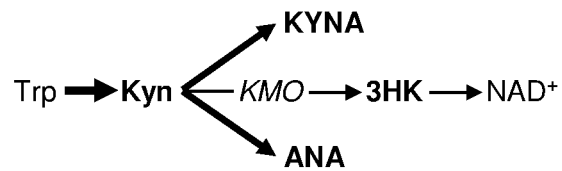
FIG. 2 illustrates a shift in Kyn downstream metabolism from formation of 3HK towards production of KYNA and ANA.

The invention is based, in part, on our discovery that correction of dysregulation of peripheral tryptophan (TRP) metabolism, via the kynurenine (KYN) pathway (KP), can lead to beneficial effects with respect to certain features of metabolic syndrome (MetS). In the KP, tryptophan is converted to KYN, which then may be converted into 3-hydroxykynurenine (3HK; the major route to production of NAD+) or other metabolic products (anthranilic acid [ANA], kynurenic acid [KYNA], and xanthurenic acid [XA]). We reported a shift of KYN downstream metabolism away from the formation of 3HK and towards the production of ANA, KYNA, and XA in a MetS animal model (8 week old Zucker fatty rats) and in conditions associated with chronic inflammation including aging, prediabetes, type 2 diabetes, dyslipidemia, and exposure to antipsychotic medication. Accordingly, the invention provides methods of preventing and treating these and related diseases and conditions by the use of agents that block or reduce the formation or activity of one or more of Kyn, ANA, KYNA, and XA in the KP of TRP metabolism. The methods and compositions of the invention are described further, as follows.

Therapeutic Methods

The methods of the invention can be used to treat subjects (e.g., human patients) who may benefit from correction of dysregulation of TRP metabolism, as explained above. These subjects include those that have or are at risk of developing metabolic syndrome (MetS), including MetS associated with antipsychotic drug treatment and/or chronic, low-grade, sub-clinical Th1-type inflammation, as well as other diseases and conditions associated with Th1-type inflammatory responses.

Subjects treated with antipsychotic medications, and thus who may benefit from treatment according to present invention, include, e.g., patients having or at risk of developing schizophrenia, schizoaffective disorder, bipolar disorder, depression (e.g., psychotic depression or treatment-resistant depression), or other conditions requiring administration of an antipsychotic drug. Treatment according to the methods of the invention can further be used to decrease morbidity and mortality of subjects treated with antipsychotic drugs. The methods of the invention can further involve selection of a subject for treatment, as described herein.

Subjects having or at risk of developing diseases or conditions relating to chronic Th1-type inflammation can also be treated according to the invention. The body responds to injury by the induction of an inflammatory response, which is supposed to eliminate the injury (e.g., an infection). The inflammatory response is initiated by the production of pro-inflammatory factors (Th-1 type), e.g., interleukin-1 (IL-1), IL-12, IL-18, tumor necrosis factor (TNF), and interferon gamma (IFN-gamma). The Th-1 phase is then followed by and typically replaced with production of anti-inflammatory factors (Th-2 type), e.g., interleukin (IL)-1 receptor antagonist, IL-4, IL-10, IL-11, and IL-13. A balance between proinflammatory and anti-inflammatory cytokines is necessary to maintain health.

Pathological continuation of the Th-1 phase can lead to chronic, subclinical, low-grade inflammation, which can be associated with aging, depression, schizophrenia, metabolic syndrome (and related diseases such as type 2 diabetes, obesity, and atherosclerosis), cancer, and Alzheimer's type dementia. Pro-inflammatory factors activate the kynurenine pathway (KP) of tryptophan metabolism and, accordingly, dysregulation of the KP may be a mechanism that mediates development of diseases by chronic Th-1 inflammation. As noted above, the KP is initiated by conversion of tryptophan into kynurenine (KYN). The major route of KYN metabolism is formation of 3-hydroxykynurenine (3HK) (and, eventually NAD+). KYN also may be converted to kynurenic (KYNA), anthranilic (ANA), and xanthurenic (XA) acids. Shifting of KYN metabolism from formation of 3HK towards production of KYNA, ANA, and XA may lead to diseases because of pro-oxidative, diabetogenic, and pro-obesity effects of these derivatives. According to the methods of the present invention, mitigation of pathogenic effects of dysregulation of KYN metabolism can be achieved by inhibition of Kyn production and/or inhibition of formation of KYNA, ANA, and XA from KYN using, e.g., the compounds and compositions described herein. The methods and compositions of the invention can therefore be used in the prevention and treatment of chronic Th1-type inflammatory responses and related diseases and conditions including, e.g., effects of aging, depression, schizophrenia, metabolic syndrome (and related disease such as type 2 diabetes, obesity, and atherosclerosis), cancer, and Alzheimer's type dementia. The methods of the invention can further involve selection of a subject for treatment, as described herein.

Pharmaceutical Agents

Pharmaceutical agents that can be used in the methods and compositions of the invention include, for example, benserazide (e.g., L-benserazide; also see elsewhere herein), carbidopa, and related molecules (and combinations thereof). Compounds included within Formula I or Formula II, as set forth above, including compounds listed above in the Summary of the Invention, can also be used.

Benserazide

Benserazide (serazide; Ro 4-4602; seryl-(2,3,4-trihydroxybenzyl)-hydrazide) can be used in the methods of the invention. In particular examples, L-benserazide (S-enantiomer) is used in the methods of the invention. The invention also includes the use of D,L-benserazide (R,S-enantiomers) or D-benserazide (R-enantiomer), as well as the use of related compounds including, for example, seryl-(3,4-dihydroxylbenzyl)-hydrazide; threonyl-(2,3,4-trihydroxybenzyl))-hydrazide; alanyl-(2,3,4-trihydroxybenzyl)-hydrazide; 2,3,4-trihydroxybenzyl-hydrazine; and other compounds within Formula I (see above). As is known in the art, these compounds can optionally be present in salt and/or pro-drug forms. Furthermore, the compounds can be used in their S enantiomeric form, R enantiomeric form, or as racemic mixtures, as can be determined to be appropriate by those of skill in the art. Additional information concerning benserazide and related compounds, including synthetic methods, can be found in U.S. Pat. No. 3,178,476, which is incorporated herein by reference.

Carbidopa

Carbidopa (lodosyn; α-hydrazino-α-methyl-β-2,4-dihydroxyphenylpropionic acid) is an aromatic L-amino acid decarboxylase inhibitor or DOPA decarboxylase inhibitor, and is widely available due to its use in the treatment of Parkinson's disease. In addition to carbidopa, related compounds can also be used in the methods and compositions of the invention including, for example, those listed below. As is known in the art, these compounds can optionally be present in salt and/or pro-drug forms. Furthermore, the compounds can be used in their R enantiomeric form, S enantiomeric form, or as racemic mixtures, as can be determined to be appropriate by those of skill in the art. Additional information concerning carbidopa and related compounds, including synthetic methods, can be found in U.S. Pat. No. 3,462,536, which is incorporated herein by reference.

Compounds related to carbidopa that can be used in the methods and compositions of the invention include, e.g., α-hydrazino-β-phenylpropionic acid; α-hydrazino-α-methyl-β-phenylpropionic acid; α-hydrazino-β-3-hydroxyphenylpropionic acid; α-hydrazino-α-methyl-β-3-hydroxyphenylpropionic acid; α-hydrazino-α-methyl-β-4-hydroxyphenylpropionic acid; α-hydrazino-β-3,4-dihydroxyphenylpropionic acid; α-hydrazino-α-methyl-β-3,4-dihydroxyphenylpropionic acid; α-hydrazino-α-methyl-β-2,3-dihydroxyphenylpropionic acid; α-hydrazino-α-methyl-β-3-hydroxy-4-methylphenylpropionic acid; α-hydrazino-α-methyl-β-3-hydroxy-4-chlorophenylpropionic acid; α-hydrazino-α-methyl-β-3-hydroxy-4-bromophenylpropionic acid; α-hydrazino-α-methyl-β-3-hydroxy-4-fluorophenylpropionic acid; α-hydrazino-α-methyl-β-3-hydroxy-4-trifluoromethylpropionic acid; α-hydrazino-α-methyl-β-3-hydroxy-4-ethylphenylpropionic acid; α-hydrazino-α-methyl-β-2,5-dihydroxyphenylpropionic acid; α-hydrazino-α-methyl-β-3,4,5-trihydroxyphenylpropionic acid; α-hydrazino-α-methyl-β-2,4,5-trihydroxyphenylpropionic acid; α-hydrazino-α-methyl-β-2,3,4-trihydroxyphenylpropionic acid; α-hydrazino-α-ethyl-β-3-hydroxyphenylpropionic acid; α-hydrazino-α-ethyl-β-4-hydroxyphenylpropionic acid; α-hydrazino-α-ethyl-β-3,4-hydroxyphenylpropionic acid; α-hydrazino-α-ethyl-β-2,3-dihydroxyphenylpropionic acid; α-hydrazino-α-ethyl-β-2,5-dihydroxyphenylpropionic acid; α-hydrazino-α-ethyl-β-2,4-dihydroxyphenylpropionic acid; α-hydrazino-α-ethyl-β-3,4,5-trihydroxyphenylpropionic acid; α-hydrazino-α-ethyl-β-2,4,5-trihydroxyphenylpropionic acid; α-hydrazino-α-ethyl-β-2,3,4-trihydroxyphenylpropionic acid; α-hydrazino-α-propyl-β-3-hydroxyphenylpropionic acid; α-hydrazino-α-propyl-β-4-hydroxyphenylpropionic acid; α-hydrazino-α-propyl-β-3,4-hydroxyphenylpropionic acid; α-hydrazino-α-propyl-β-2,3-dihydroxyphenylpropionic acid; α-hydrazino-α-propyl-β-2,4-dihydroxyphenylpropionic acid; α-hydrazino-α-propyl-β-2,5-dihydroxyphenylpropionic acid; α-hydrazino-α-propyl-β-3,4,5-trihydroxyphenylpropionic acid; α-hydrazino-α-propyl-β-2,4,5-trihydroxyphenylpropionic acid; α-hydrazino-α-propyl-β-2,3,4-trihydroxyphenylpropionic acid; α-hydrazino-α-butyl-β-3-hydroxyphenylpropionic acid; α-hydrazino-α-butyl-β-4-hydroxyphenylpropionic acid; α-hydrazino-α-butyl-β-3,4-hydroxyphenylpropionic acid; α-hydrazino-α-butyl-β-2,3-dihydroxyphenylpropionic acid; α-hydrazino-α-butyl-β-2,4-dihydroxyphenylpropionic acid; α-hydrazino-α-butyl-β-2,5-dihydroxyphenylpropionic acid; α-hydrazino-α-butyl-β-3,4,5-trihydroxyphenylpropionic acid; α-hydrazino-α-butyl-β-2,4,5-trihydroxyphenylpropionic acid; α-hydrazino-α-butyl-β-2,3,4-trihydroxyphenylpropionic acid; α-hydrazino-α-β-dimethyl-β-3-hydroxyphenylpropionic acid; α-hydrazino-α,β-dimethyl-β-4-hydroxyphenylpropionic acid; α-hydrazino-α,β-dimethyl-β-3,4-hydroxyphenylpropionic acid; α-hydrazino-α-β-dimethyl-β-2,3-dihydroxyphenylpropionic acid; α-hydrazino-α,β-dimethyl-β-2,4-dihydroxyphenylpropionic acid; α-hydrazino-α,β-dimethyl-β-2,5-dihydroxyphenylpropionic acid; α-hydrazino-α-β-dimethyl-β-3,4,5-trihydroxyphenylpropionic acid; α-hydrazino-α-β-dimethyl-β-2,4,5-trihydroxyphenylpropionic acid; α-hydrazino-α-β-dimethyl-β-2,3,4-trihydroxyphenylpropionic acid; α-hydrazino-α-ethyl-β-methyl-β-3-hydroxyphenylpropionic acid; α-hydrazino-α-ethyl-β-methyl-β-4-hydroxyphenylpropionic acid; α-hydrazino-α-ethyl-β-methyl-β-3,4-hydroxyphenylpropionic acid; α-hydrazino-α-ethyl-β-methyl-β-2,3-dihydroxyphenylpropionic acid; α-hydrazino-α-ethyl-β-methyl-β-2,4-dihydroxyphenylpropionic acid; α-hydrazino-α-ethyl-β-methyl-β-2,5-dihydroxyphenylpropionic acid; α-hydrazino-α-ethyl-β-methyl-3,4,5-trihydroxyphenylpropionic acid; α-hydrazino-α-ethyl-β-methyl-β-2,4,5-trihydroxyphenylpropionic acid; α-hydrazino-α-ethyl-β-methyl-β-2,3,4-trihydroxyphenylpropionic acid; α-hydrazino-α-methyl-β-ethyl-β-3-hydroxyphenylpropionic acid; α-hydrazino-α-methyl-β-ethyl-β-4-hydroxyphenylpropionic acid; α-hydrazino-α-methyl-β-ethyl-β-3,4-hydroxyphenylpropionic acid; α-hydrazino-α-methyl-β-ethyl-β-2,3-dihydroxyphenylpropionic acid; α-hydrazino-α-methyl-β-ethyl-β-2,5-dihydroxyphenylpropionic acid; α-hydrazino-α-methyl-β-ethyl-β-3,4,5-trihydroxyphenylpropionic acid; α-hydrazino-α-methyl-β-ethyl-β-2,4,5-trihydroxyphenylpropionic acid; $N^2$-isopropylidenyl-α-hydrazino-α-methyl-β-(3,4-dihydroxyphenyl) propionic acid; $N^2$-isopropyl-α-hydrazino-α-methyl-β-(3,4-dihydroxyphenyl) propionic acid; α-hydrazino-α-methyl-β-3,4-dihydroxyphenylpropionic acid ethyl ester; α-hydrazino-α-methyl-β-3,4-dihydroxyphenylpropionic acid ethyl ester; α-hydrazino-α-methyl-β-3,4-dihydroxyphenylpropionic acid ethyl ester hydrochloride; α-hydrazino-α-ethyl-β-3,4-dihydroxyphenylpropionic acid; α-hydrazino-α,β-dimethyl-β-3,4-dihydroxyphenylpropionic acid; α-hydrazino-β-(3,4-dihydroxyphenyl) propionic acid; α-hydrazino-β-(3-hydroxyphenyl) propionic acid; α-hydrazino-β-(4-hydroxyphenyl) propionic acid; and other compounds within the scope of Formula II (see above).

Combinations

Pharmaceutical agents that can be used in the invention (see, e.g., above) can optionally be used in combination with other agents and/or treatment regimens that are known in the art for the prevention and treatment of a disease or condition that a subject may have (see, e.g., the list set forth above).

Thus, in one example, the pharmaceutical compounds used in the methods and compositions of the invention (e.g., benserazide (L-benserazide (S-enantiomer), D,L-benserazide (R,S-enantiomers), or D-benserazide (R-enantiomer)), carbidopa, and/or related compounds) are administered in combination with antipsychotic drugs to patients in need of antipsychotic drug treatment (see above). Thus, for example, one or more pharmaceutical compounds of the present invention (e.g., benserazide (L-benserazide (S-enantiomer), D,L-benserazide (R,S-enantiomers), or D-benserazide (R-enantiomer)), carbidopa, and/or related compounds) can optionally be administered in combination with (or to a subject under treatment with) (a) an atypical antipsychotic drug, optionally selected from the group consisting of a benzamide, benzisoxazole/benzisothiazole, butyrophenone, phenylpiperazine/quinolinone, and tricyclic;

and/or (b) a typical antipsychotic, optionally selected from the group consisting of a butyrophenone, diphenylbutylpiperidine, phenothiazine, and thioxanthene.

In various examples, the benzamide is selected from the group consisting of amisulpride, nemonapride, remoxipride, and sultopride; the benzisoxazole/benzisothiazole is selected from the group consisting of iloperidone, lurasicone, paliperidone, paliperidone palmitate, perospirone, risperidone, and ziprasidone; the butyrophenone is melperone; the phenylpiperazine/quinolinone is selected from the group consisting of aripiprazole, aripiprazole lauroxil, brexpiprazole, and cariprazine; and the tricyclic is selected from the group consisting of asenapin, clozapine, olanzapine, quetiapine, and zotepine.

In various examples, the butyrophenone is selected from the group consisting of benperidol, bromperidol, droperidol, haloperidol, and timiperone; the diphenylbutylpiperidine is selected from the group consisting of fluspirilene, penfluridol, and pimozide; the phenothiazine is selected from the group consisting of chlorpromazine, cyamemazine, dixyrazine, fluphenazine, levomepromazine, perazine, pericyazine, perphenazine, pipotiazine, prochlorperazine, promethazine, prothipendyl, thioproperazine, and trifluoperazine; and the thioxanthene is selected from the group consisting of chlorprothixene, clopenthixol, flupentixol, thiothixene, and zuclopenthixol.

Other combinations that are included in the invention are combinations of the pharmaceutical compounds of the invention (e.g., benserazide (L-benserazide (S-enantiomer), D,L-benserazide (R,S-enantiomers), or D-benserazide (R-enantiomer)), carbidopa, and/or related compounds) and antidiabetic treatments. Accordingly, the compounds of the invention can be combined with any one or more of a biguanide (e.g., metformin), dopamine agonist (e.g., bromocriptine), DPP-4 inhibitor (e.g., alogliptin, linagliptin, saxagliptin, and sitagliptin), glucagon-like peptide (e.g., albiglutide, dulaglutide, exenatide, exenitide extended-release, and liragludite), meglitinide (e.g., nateglinide and repaglinide), sodium glucose transporter (SGLT) 2 inhibitor (e.g., dapagliflozin, canagliflozin, and empagliflozin), sulfonylurea (e.g., glimepiride, gliclazide, glipizide, glyburide, chlorpropamide, tolazamide, and tolbutamide), or thiazolidinedione (e.g., rosiglitazone and pioglitazone), and combinations thereof.

One or more pharmaceutical compound of the invention (e.g., benserazide (L-benserazide (S-enantiomer), D,L-benserazide (R,S-enantiomers), or D-benserazide (R-enantiomer)), carbidopa, and/or related compounds) can be present in a separate formulation from the one or more other drugs (e.g., antipsychotic drugs or antidiabetic drugs as described herein). Alternatively, the one or more pharmaceutical compounds (e.g., benserazide (L-benserazide (S-enantiomer), D,L-benserazide (R,S-enantiomers), or D-benserazide (R-enantiomer)), carbidopa, and/or related compounds) can be present in the same formulation (e.g., a tablet, a capsule, nanoparticles, or liposomes) as the other drugs (e.g., the antipsychotic drugs or the antidiabetic drugs). Formulations that can be used in the present invention, whether in the context of the administration of a sole therapeutic agent or a combination, are described further below.

Pharmaceutical Compositions

The compounds used in the methods described herein are can be formulated into pharmaceutical compositions for administration to subjects (e.g., human subjects) in a biologically compatible form suitable for administration in vivo. Pharmaceutical compositions typically include one or more compounds as described herein and a pharmaceutically acceptable excipient.

The compounds described herein can be used in the form of the free base, in the form of salts, zwitterions, solvates, or as prodrugs, or pharmaceutical compositions thereof. All forms are within the scope of the invention. The compounds, salts, zwitterions, solvates, prodrugs, or pharmaceutical compositions thereof may be administered to a patient in a variety of forms depending on the selected route of administration, as will be understood by those skilled in the art. The compounds used in the methods described herein may be administered, for example, by oral, parenteral, buccal, sublingual, nasal, rectal, patch, pump, or transdermal administration, and the pharmaceutical compositions formulated accordingly. Parenteral administration includes intravenous, intraperitoneal, subcutaneous, intramuscular, transepithelial, nasal, intrapulmonary, intrathecal, rectal, and topical modes of administration. Parenteral administration may be by continuous infusion over a selected period of time.

For human use, a compound of the invention can be administered alone or in admixture with a pharmaceutical carrier selected with regard to the intended route of administration and standard pharmaceutical practice. Pharmaceutical compositions for use in accordance with the present invention thus can be formulated in a conventional manner using one or more physiologically acceptable carriers comprising excipients and auxiliaries that facilitate processing of a compound of the invention into preparations which can be used pharmaceutically.

The invention also includes pharmaceutical compositions that can contain one or more pharmaceutically acceptable carrier. In making the pharmaceutical compositions of the invention, the active ingredient(s) is typically mixed with an excipient, diluted by an excipient or enclosed within a carrier in the form of, for example, a capsule, sachet, paper, or other container. When the excipient serves as a diluent, it can be a solid, semisolid, or liquid material (e.g., normal saline), which acts as a vehicle, carrier, or medium for the active ingredient. Thus, the compositions can be in the form of tablets, capsules, liposomes, nanoparticles, powders, lozenges, sachets, cachets, elixirs, suspensions, emulsions, solutions, syrups, and soft and hard gelatin capsules. As is known in the art, the type of diluent can vary depending upon the intended route of administration. The resulting compositions can include additional agents, e.g., preservatives.

The excipient or carrier is selected on the basis of the mode and route of administration. Suitable pharmaceutical carriers, as well as pharmaceutical necessities for use in pharmaceutical formulations, are described in *Remington: The Science and Practice of Pharmacy*, 21$^{st}$ Ed., Gennaro, Ed., Lippincott Williams & Wilkins (2005), a well-known reference text in this field, and in the USP/NF (United States Pharmacopeia and the National Formulary). Examples of suitable excipients are lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, water, syrup, and methyl cellulose. The formulations can additionally include, optionally, lubricating agents, e.g., talc, magnesium stearate, and mineral oil; wetting agents; emulsifying and suspending agents; preserving agents, e.g., methyl- and propylhydroxybenzoates; sweetening agents; and flavoring agents. Other exemplary excipients are described in *Handbook of Pharmaceutical Excipients*, 6$^{th}$ Edition, Rowe et al., Eds., Pharmaceutical Press (2009).

These pharmaceutical compositions can be manufactured in a conventional manner, e.g., by conventional mixing, dissolving, granulating, dragee-making, levigating, emulsifying, encapsulating, entrapping, or lyophilizing processes. Methods well known in the art for making formulations are found, for example, in *Remington: The Science and Practice of Pharmacy*, 21$^{st}$ Ed., Gennaro, Ed., Lippincott Williams & Wilkins (2005), and Encyclopedia of Pharmaceutical Technology, eds. J. Swarbrick and J. C. Boylan, 1988-1999, Marcel Dekker, New York. Proper formulation is dependent upon the route of administration chosen. The formulation and preparation of such compositions is well-known to those skilled in the art of pharmaceutical formulation. In preparing a formulation, the active compound can be milled to provide the appropriate particle size prior to combining with the other ingredients. If the active compound is substantially insoluble, it can be milled to a particle size of less than 200 mesh. If the active compound is substantially water soluble, the particle size can be adjusted by milling to provide a substantially uniform distribution in the formulation, e.g., about 40 mesh.

Dosages

The dosage of the compound used in the methods described herein, or pharmaceutically acceptable salts or prodrugs thereof, or pharmaceutical compositions thereof, can vary depending on many factors, e.g., the pharmacodynamic properties of the compound; the mode of administration; the age, health, and weight of the recipient; the nature and extent of the symptoms; the frequency of the treatment, and the type of concurrent treatment, if any; and the clearance rate of the compound in the animal to be treated. One of skill in the art can determine the appropriate dosage based on the above factors. The compounds used in the methods described herein may be administered initially in a suitable dosage that may be adjusted as required, depending on the clinical response. In general, a suitable daily dose of a compound of the invention will be that amount of the compound that is the lowest dose effective to produce a therapeutic effect. Such an effective dose will generally depend upon the factors described above.

A compound of the invention may be administered to the patient in a single dose or in multiple doses. When multiple doses are administered, the doses may be separated from one another by, for example, 1-24 hours, 1-7 days, 1-4 weeks, or 1-12 months. The compound may be administered according to a schedule or the compound may be administered without a predetermined schedule. An active compound may be administered, for example, 1, 2, 3, 4, 5, 6, 7, 8, 9, 10, 11, or 12 times per day, every 2$^{nd}$, 3$^{rd}$, 4$^{th}$, 5$^{th}$, or 6$^{th}$ day, 1, 2, 3, 4, 5, 6, or 7 times per week, 1, 2, 3, 4, 5, or 6 times per month, or 1, 2, 3, 4, 5, 6, 7, 8, 9, 10, 11, or 12 times per year. It is to be understood that, for any particular subject, specific dosage regimes should be adjusted over time according to the individual need and the professional judgment of the person administering or supervising the administration of the compositions.

While the attending physician ultimately will decide the appropriate amount and dosage regimen, an effective amount of a compound of the invention may be, for example, a total daily dosage of, e.g., between 0.05 mg and 3000 mg of any of the compounds described herein. Alternatively, the dosage amount can be calculated using the body weight of the patient. Such dose ranges may include, for example, between 10-1000 mg (e.g., 50-800 mg). In some embodiments, 50, 100, 150, 200, 250, 300, 350, 400, 450, 500, 550, 600, 650, 700, 750, 800, 850, 900, 950, or 1000 mg of the compound is administered.

In the methods of the invention, the time period during which multiple doses of a compound of the invention are administered to a patient can vary. For example, in some embodiments, doses of the compounds of the invention are administered to a patient over a time period that is 1-7 days; 1-12 weeks; or 1-3 months. In other embodiments, the compounds are administered to the patient over a time period that is, for example, 4-11 months or 1-30 years. In other embodiments, the compounds are administered to a patient at the onset of symptoms. In any of these embodiments, the amount of compound that is administered may vary during the time period of administration. When a compound is administered daily, administration may occur, for example, 1, 2, 3, 4, 5, 6, 7, 8, 9, 10, 11, or 12 times per day.

Formulations

A compound identified as capable of treating any of the conditions described herein, using any of the methods described herein, may be administered to patients or animals with a pharmaceutically-acceptable diluent, carrier, or excipient, in unit dosage form. The chemical compounds for use in such therapies may be produced and isolated by any standard technique known to those in the field of medicinal chemistry. Conventional pharmaceutical practice may be employed to provide suitable formulations or compositions to administer the identified compound to patients suffering from a bacterial infection. Administration may begin before the patient is symptomatic.

Exemplary routes of administration of the compounds (e.g., a compound of the invention), or pharmaceutical compositions thereof, used in the present invention include oral, sublingual, buccal, transdermal, intradermal, intramuscular, parenteral, intravenous, intra-arterial, intracranial, subcutaneous, intraorbital, intraventricular, intraspinal, intraperitoneal, intranasal, inhalation, and topical administration. The compounds desirably are administered with a pharmaceutically acceptable carrier. Pharmaceutical formulations of the compounds described herein formulated for treatment of the disorders described herein are also part of the present invention.

Formulations for Oral Administration

The pharmaceutical compositions contemplated by the invention include those formulated for oral administration ("oral dosage forms"). Oral dosage forms can be, for example, in the form of tablets, capsules, a liquid solution or suspension, a powder, or liquid or solid crystals, which contain the active ingredient(s) in a mixture with non-toxic pharmaceutically acceptable excipients. These excipients may be, for example, inert diluents or fillers (e.g., sucrose, sorbitol, sugar, mannitol, microcrystalline cellulose, starches including potato starch, calcium carbonate, sodium chloride, lactose, calcium phosphate, calcium sulfate, or sodium phosphate); granulating and disintegrating agents (e.g., cellulose derivatives including microcrystalline cellulose, starches including potato starch, croscarmellose sodium, alginates, or alginic acid); binding agents (e.g., sucrose, glucose, sorbitol, acacia, alginic acid, sodium alginate, gelatin, starch, pregelatinized starch, microcrystalline cellulose, magnesium aluminum silicate, carboxymethylcellulose sodium, methylcellulose, hydroxypropyl methylcellulose, ethylcellulose, polyvinylpyrrolidone, or polyethylene glycol); and lubricating agents, glidants, and antiadhesives (e.g., magnesium stearate, zinc stearate, stearic acid, silicas, hydrogenated vegetable oils, or talc). Other pharmaceutically acceptable excipients can be colorants, flavoring agents, plasticizers, humectants, buffering agents, and the like.

Formulations for oral administration may also be presented as chewable tablets, as hard gelatin capsules wherein the active ingredient is mixed with an inert solid diluent (e.g., potato starch, lactose, microcrystalline cellulose, calcium carbonate, calcium phosphate or kaolin), or as soft gelatin capsules wherein the active ingredient is mixed with water or an oil medium, for example, peanut oil, liquid paraffin, or olive oil. Powders, granulates, and pellets may be prepared using the ingredients mentioned above under tablets and capsules in a conventional manner using, e.g., a mixer, a fluid bed apparatus or a spray drying equipment.

Controlled release compositions for oral use may be constructed to release the active drug by controlling the dissolution and/or the diffusion of the active drug substance. Any of a number of strategies can be pursued in order to obtain controlled release and the targeted plasma concentration versus time profile. In one example, controlled release is obtained by appropriate selection of various formulation parameters and ingredients, including, e.g., various types of controlled release compositions and coatings. Examples include single or multiple unit tablet or capsule compositions, oil solutions, suspensions, emulsions, microcapsules, microspheres, nanoparticles, patches, and liposomes. In certain embodiments, compositions include biodegradable, pH, and/or temperature-sensitive polymer coatings.

Dissolution or diffusion controlled release can be achieved by appropriate coating of a tablet, capsule, pellet, or granulate formulation of compounds, or by incorporating the compound into an appropriate matrix. A controlled release coating may include one or more of the coating substances mentioned above and/or, e.g., shellac, beeswax, glycowax, castor wax, carnauba wax, stearyl alcohol, glyceryl monostearate, glyceryl distearate, glycerol palmitostearate, ethylcellulose, acrylic resins, dl-polylactic acid, cellulose acetate butyrate, polyvinyl chloride, polyvinyl acetate, vinyl pyrrolidone, polyethylene, polymethacrylate, methylmethacrylate, 2-hydroxymethacrylate, methacrylate hydrogels, 1,3 butylene glycol, ethylene glycol methacrylate, and/or polyethylene glycols. In a controlled release matrix formulation, the matrix material may also include, e.g., hydrated methylcellulose, carnauba wax and stearyl alcohol, carbopol 934, silicone, glyceryl tristearate, methyl acrylate-methyl methacrylate, polyvinyl chloride, polyethylene, and/or halogenated fluorocarbon.

The liquid forms in which the compounds and compositions of the present invention can be incorporated for administration orally include aqueous solutions, suitably flavored syrups, aqueous or oil suspensions, and flavored emulsions with edible oils, e.g., cottonseed oil, sesame oil, coconut oil, or peanut oil, as well as elixirs and similar pharmaceutical vehicles.

Formulations for Buccal Administration

Dosages for buccal or sublingual administration typically are 0.1 to 500 mg per single dose as required. In practice, the physician determines the actual dosing regimen which is most suitable for an individual patient, and the dosage varies with the age, weight, and response of the particular patient. The above dosages are exemplary of the average case, but individual instances exist wherein higher or lower dosages are merited, and such are within the scope of this invention.

For buccal administration, the compositions may take the form of tablets, lozenges, etc. formulated in a conventional manner. Liquid drug formulations suitable for use with nebulizers and liquid spray devices and electrohydrodynamic (EHD) aerosol devices will typically include a compound of the invention with a pharmaceutically acceptable carrier. Preferably, the pharmaceutically acceptable carrier is a liquid, e.g., alcohol, water, polyethylene glycol, or a perfluorocarbon. Optionally, another material may be added to alter the aerosol properties of the solution or suspension of compounds of the invention. Desirably, this material is liquid, e.g., an alcohol, glycol, polyglycol, or a fatty acid. Other methods of formulating liquid drug solutions or suspension suitable for use in aerosol devices are known to those of skill in the art (see, e.g., Biesalski, U.S. Pat. No. 5,112,598 and Biesalski, U.S. Pat. No. 5,556,611, each of which is herein incorporated by reference).

Formulations for Nasal or Inhalation Administration

The compounds may also be formulated for nasal administration. Compositions for nasal administration also may conveniently be formulated as aerosols, drops, gels, and powders. The formulations may be provided in a single or multidose form. In the case of a dropper or pipette, dosing may be achieved by the patient administering an appropriate, predetermined volume of the solution or suspension. In the case of a spray, this may be achieved, for example, by means of a metering atomizing spray pump.

The compounds may further be formulated for aerosol administration, particularly to the respiratory tract by inhalation and including intranasal administration. The compound will generally have a small particle size for example on the order of five (5) microns or less. Such a particle size may be obtained by means known in the art, for example by micronization. The active ingredient is provided in a pressurized pack with a suitable propellant, e.g., a chlorofluorocarbon (CFC), for example, dichlorodifluoromethane, trichlorofluoromethane, or dichlorotetrafluoroethane, or carbon dioxide, or other suitable gas. The aerosol may conveniently also contain a surfactant, e.g., lecithin. The dose of drug may be controlled by a metered valve. Alternatively, the active ingredients may be provided in a form of a dry powder, e.g., a powder mix of the compound in a suitable powder base, e.g., lactose, starch, and starch derivatives, e.g., hydroxypropylmethyl cellulose, and polyvinylpyrrolidine (PVP). The powder carrier will form a gel in the nasal cavity. The powder composition may be presented in unit dose form for example in capsules or cartridges of e.g., gelatin or blister packs from which the powder may be administered by means of an inhaler.

Aerosol formulations typically include a solution or fine suspension of the active substance in a physiologically acceptable aqueous or non-aqueous solvent and are usually presented in single or multidose quantities in sterile form in a sealed container, which can take the form of a cartridge or refill for use with an atomizing device. Alternatively, the sealed container may be a unitary dispensing device, e.g., a single dose nasal inhaler or an aerosol dispenser fitted with a metering valve which is intended for disposal after use. Where the dosage form comprises an aerosol dispenser, it will contain a propellant, which can be a compressed gas, e.g., compressed air or an organic propellant, e.g., fluorochlorohydrocarbon. The aerosol dosage forms can also take the form of a pump-atomizer.

Formulations for Parenteral Administration

The compounds described herein for use in the methods of the invention can be administered in a pharmaceutically acceptable parenteral (e.g., intravenous or intramuscular) formulation as described herein. The pharmaceutical formulation may also be administered parenterally (intravenous, intramuscular, subcutaneous or the like) in dosage forms or formulations containing conventional, non-toxic pharmaceutically acceptable carriers and adjuvants. In particular, formulations suitable for parenteral administration include aqueous and non-aqueous sterile injection solutions which may contain anti-oxidants, buffers, bacteriostats and solutes which render the formulation isotonic with the blood of the intended recipient; and aqueous and non-aqueous sterile suspensions which may include suspending agents and thickening agents. For example, to prepare such a composition, the compounds of the invention may be dissolved or suspended in a parenterally acceptable liquid vehicle. Among acceptable vehicles and solvents that may be employed are water, water adjusted to a suitable pH by addition of an appropriate amount of hydrochloric acid, sodium hydroxide or a suitable buffer, 1,3-butanediol, Ringer's solution and isotonic sodium chloride solution. The aqueous formulation may also contain one or more preservatives, for example, methyl, ethyl, or n-propyl p-hydroxybenzoate. Additional information regarding parenteral formulations can be found, for example, in the United States Pharmacopeia-National Formulary (USP-NF), herein incorporated by reference.

The parenteral formulation can be any of the five general types of preparations identified by the USP-NF as suitable for parenteral administration: (1) "Drug Injection:" a liquid preparation that is a drug substance (e.g., a compound of the invention), or a solution thereof; (2) "Drug for Injection:" the drug substance (e.g., a compound of the invention) as a dry solid that will be combined with the appropriate sterile vehicle for parenteral administration as a drug injection; (3) "Drug Injectable Emulsion:" a liquid preparation of the drug substance (e.g., a compound of the invention) that is dissolved or dispersed in a suitable emulsion medium; (4) "Drug Injectable Suspension:" a liquid preparation of the drug substance (e.g., a compound of the invention) suspended in a suitable liquid medium; and (5) "Drug for Injectable Suspension:" the drug substance (e.g., a compound of the invention) as a dry solid that will be combined with the appropriate sterile vehicle for parenteral administration as a drug injectable suspension.

Exemplary formulations for parenteral administration include solutions of the compound prepared in water suitably mixed with a surfactant, e.g., hydroxypropylcellulose. Dispersions can also be prepared in glycerol, liquid polyethylene glycols, DMSO and mixtures thereof with or without alcohol, and in oils. Under ordinary conditions of storage and use, these preparations may contain a preservative to prevent the growth of microorganisms. Conventional procedures and ingredients for the selection and preparation of suitable formulations are described, for example, in *Remington: The Science and Practice of Pharmacy*, $21^{st}$ Ed., Gennaro, Ed., Lippincott Williams & Wilkins (2005) and in the United States Pharmacopeia: the National Formulary (USP 36 NF31), published in 2013.

Formulations for parenteral administration may, for example, contain excipients, sterile water, or saline, polyalkylene glycols, e.g., polyethylene glycol, oils of vegetable origin, or hydrogenated napthalenes. Biocompatible, biodegradable lactide polymer, lactide/glycolide copolymer, or polyoxyethylene-polyoxypropylene copolymers may be used to control the release of the compounds.

Other potentially useful parenteral delivery systems for compounds include ethylene-vinyl acetate copolymer particles, osmotic pumps, implantable infusion systems, and liposomes. Formulations for inhalation may contain excipients, for example, lactose, or may be aqueous solutions containing, for example, polyoxyethylene-9-lauryl ether, glycocholate and deoxycholate, or may be oily solutions for administration in the form of nasal drops, or as a gel.

The parenteral formulation can be formulated for prompt release or for sustained/extended release of the compound. Exemplary formulations for parenteral release of the compound include: aqueous solutions, powders for reconstitution, cosolvent solutions, oil/water emulsions, suspensions, oil-based solutions, liposomes, microspheres, and polymeric gels.

EXAMPLES

The following examples are meant to illustrate the invention. They are not meant to limit the invention in any way.

Example 1

C57BL female mice (n=10 mice in each group) were treated with olanzapine (4 mg/kg, po) (control) or with a combination of olanzapine (4 mg/kg, po) and benserazide (100 mg/day, po), 5 days per week for 10 weeks.

Body weight was checked two times per week. Glucose tolerance, a marker of IR, was determined by a glucose tolerance test (GTT) at the end of the study (day 71). In addition, blood samples were analyzed for cholesterol (total) and triglycerides. Benserazide attenuated weight gain (Table 1) and elevation of cholesterol (−17%) and triglycerides (−25%) (Table 2) induced by olanzapine.

TABLE 1

Effect of Benzerazide on Olanzapine-Induced Weight Gain

|  | Day 1 (n = 10) | Day 71 (n = 10) |
|---|---|---|
| Olanzapine | 17.4 ± 0.13* | 34.0 ± 0.09 |
| Olanzapine + Benserazide | 17.1 ± 0.11* | 27.3 ± 0.5** |

*vs day 71
**vs olanzapine group Mann-Whitney two-tailed test

TABLE 2

Effect of Benserazide on Blood Lipids and Glucose

|  | Olanzapine | Olanzapine + Benserazide | P | % |
|---|---|---|---|---|
| Triglycerides | 151.00 ± 5.37 | 112.83 ± 9.34 | 0.005* | −25.3% |
| Cholesterol | 172.33 ± 4.536 | 143.67 ± 7.658 | 0.01 | −17% |
| Glucose levels baseline (before ingestion of sugar) | 183.25 ± 10.49 | 183.25 ± 10.49 |  |  |
| Glucose levels 90 minutes after ingestion of sugar | 520.55 ± 15.63 | 320.57 ± 12.17 | 0.09 | −38% |

N = 10,
*Mann-Whitney two-tailed test

Example 2

In other experiments, we conducted a pre-clinical trial of benserazide on the development of MetS induced by high-fat diet (HFD). HFD was fed to C57Bl/j male mice (6 weeks of age). Benserazide, 50 mg/day, p.o., was administered for 12 weeks (five days/week). Differences (p<0.05) were considered as statistically significant (Mann-Whitney two-tailed test). We observed that benserazide attenuated excessive weight gain (−40%), elevation of blood cholesterol (−17%) and triglycerides (−25%), and glucose tolerance impairment, induced by HFD.

OTHER EMBODIMENTS

Various modifications and variations of the described invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention. Some embodiments are within the scope of the following numbered paragraphs.

1. A method for preventing or treating metabolic syndrome induced by an anti-psychotic medication in a subject in need thereof, the method comprising administering to the subject:

(a) a compound of Formula I:

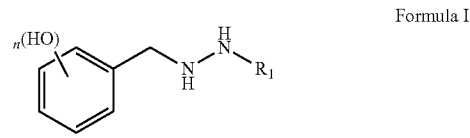

Formula I or a pharmaceutically-acceptable salt thereof, wherein $R_1$ is selected from the group consisting of hydrogen and amino-substituted acyl, and n is a whole integer from 2 to 3; or (b) a compound of Formula II:

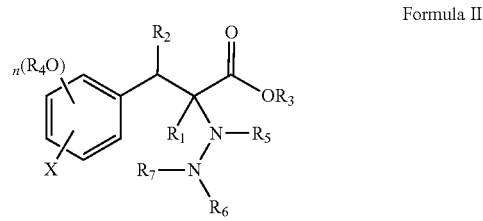

Formula II or a pharmaceutically-acceptable salt thereof, wherein $R_1$, $R_2$, and $R_3$ are each independently hydrogen or lower alkyl, $R_4$ and $R_5$ are independently hydrogen or lower alkanoyl, $R_6$ is hydrogen, lower alkanoyl, lower alkyl, or together with $R_7$ lower alkylidenyl, $R_7$ is hydrogen, lower alkyl, or together with $R_6$ lower alkylidenyl; n is a whole integer from 0 to 3, and X is selected from the group consisting of hydrogen, alkyl, halogen, and tri-fluoromethyl, X being para to the acidic side chain when other than hydrogen.

2. The method of paragraph 1, wherein the compound is of Formula I and is selected from the S enantiomer, the R enantiomer, and a racemic mixture of the compound.

3. The method of paragraph 1, wherein the compound is of Formula II and is selected from the S enantiomer, the R enantiomer, and a racemic mixture of the compound.

4. A method of preventing the onset of a disease or condition associated with dysregulation of the kynurenine pathway of tryptophan metabolism in a subject in need thereof, the method comprising administering to the subject a compound of Formula I or Formula II, as set forth in any one of paragraphs 1 to 3, or a pharmaceutically acceptable salt thereof.

5. The method of paragraph 4, wherein the disease or condition associated with dysregulation of the kynurenine pathway of tryptophan metabolism is selected from the group consisting of pre-diabetes; type II diabetes; obesity; chronic, low-grade, sub-clinical Th1-type inflammation; cardiovascular disease; stroke; major depressive disorder; schizophrenia; bipolar disorder; Alzheimer's type dementia; and aging-associated metabolic syndrome.

6. The method of paragraph 5, wherein the compound of Formula I or Formula II is administered in combination with one or more additional therapy for the disease or condition.

7. A method of decreasing morbidity or mortality in a subject treated with an anti-psychotic drug, the method comprising administering to the subject a compound of Formula I or Formula II, as set forth in any one of paragraphs 1 to 3, or a pharmaceutically acceptable salt thereof.

8. The method of any one of paragraphs 1 to 7, wherein the compound of Formula I or Formula II is administered in a form selected from the group consisting of a tablet, a capsule, nanoparticles, and liposomes.

9. The method of any one of paragraphs 1 to 8, wherein the compound is of Formula I and $R_1$ is an alpha-amino acyl or a beta-amino acyl.

10. The method of paragraph 9, wherein $R_1$ is an amino-lower alkanoyl or a hydroxy-substituted amino-lower alkanoyl.

11. The method of paragraph 9 or 10, wherein $R_1$ is selected from seryl, threonyl, alanyl, and beta-amino-propionyl.

12. The method of any one of paragraphs 1, 2, and 4 to 8, wherein the compound is of Formula I and is selected from the group consisting of seryl-(3,4-dihydroxylbenzyl)-hydrazide, seryl-(2,3,4-trihydroxybenzyl)-hydrazide, threonyl-(2,3,4-trihydroxybenzyl))-hydrazide, alanyl-(2,3,4-trihydroxybenzyl)-hydrazide, and 2,3,4-trihydroxybenzyl-hydrazine.

13. The method of any one of paragraphs 1 and 3 to 8, wherein the compound is of Formula II and is selected from the group consisting of α-hydrazino-β-phenylpropionic acid; α-hydrazino-α-methyl-β-phenylpropionic acid; α-hydrazino-β-3-hydroxyphenylpropionic acid; α-hydrazino-α-methyl-β-3-hydroxyphenylpropionic acid; α-hydrazino-α-methyl-β-4-hydroxyphenylpropionic acid; α-hydrazino-β-3,4-dihydroxyphenylpropionic acid; α-hydrazino-α-methyl-β-3,4-dihydroxyphenylpropionic acid; α-hydrazino-α-methyl-β-2,3-dihydroxyphenylpropionic acid; α-hydrazino-α-methyl-β-2,4-dihydroxyphenylpropionic acid; α-hydrazino-α-methyl-β-3-hydroxy-4-methylphenylpropionic acid; α-hydrazino-α-methyl-β-3-hydroxy-4-chlorophenylpropionic acid; α-hydrazino-α-methyl-β-3-hydroxy-4-bromophenylpropionic acid; α-hydrazino-α-methyl-β-3-hydroxy-4-fluorophenylpropionic acid; α-hydrazino-α-methyl-β-3-hydroxy-4-trifluoromethylpropionic acid; α-hydrazino-α-methyl-β-3-hydroxy-4-ethylphenylpropionic acid; α-hydrazino-α-methyl-β-2,5-dihydroxyphenylpropionic acid; α-hydrazino-α-methyl-β-3,4,5-trihydroxyphenylpropionic acid; α-hydrazino-α-methyl-β-2,4,5-trihydroxyphenylpropionic acid; α-hydrazino-α-methyl-β-2,3,4-trihydroxyphenylpropionic acid; α-hydrazino-α-ethyl-β-3-hydroxyphenylpropionic acid; α-hydrazino-α-ethyl-β-4-hydroxyphenylpropionic acid; α-hydrazino-α-ethyl-β-3,4-hydroxyphenylpropionic acid; α-hydrazino-α-ethyl-β-2,3-dihydroxyphenylpropionic acid; α-hydrazino-α-ethyl-β-2,5-dihydroxyphenylpropionic acid; α-hydrazino-α-ethyl-β-2,4-dihydroxyphenylpropionic acid; α-hydrazino-α-ethyl-β-3,4,5-trihydroxyphenylpropionic acid; α-hydrazino-α-ethyl-β-2,4,5-trihydroxyphenylpropionic acid; α-hydrazino-α-ethyl-β-2,3,4-trihydroxyphenylpropionic acid; α-hydrazino-α-propyl-β-3-hydroxyphenylpropionic acid; α-hydrazino-α-propyl-β-4-hydroxyphenylpropionic acid; α-hydrazino-α-propyl-β-3,4-hydroxyphenylpropionic acid; α-hydrazino-α-propyl-β-2,3-dihydroxyphenylpropionic acid; α-hydrazino-α-propyl-β-2,4-dihydroxyphenylpropionic acid; α-hydrazino-α-propyl-β-2,5-dihydroxyphenylpropionic acid; α-hydrazino-α-propyl-β-3,4,5-trihydroxyphenylpropionic acid; α-hydrazino-α-propyl-β-2,4,5-trihydroxyphenylpropionic acid; α-hydrazino-α-propyl-β-2,3,4-trihydroxyphenylpropionic acid; α-hydrazino-α-butyl-β-3-hydroxyphenylpropionic acid; α-hydrazino-α-butyl-β-4-hydroxyphenylpropionic acid; α-hydrazino-α-butyl-β-3,4-hydroxyphenylpropionic acid; α-hydrazino-α-butyl-β-2,3-dihydroxyphenylpropionic acid; α-hydrazino-α-butyl-β-2,4-dihydroxyphenylpropionic acid; α-hydrazino-α-butyl-β-2,5-dihydroxyphenylpropionic acid; α-hydrazino-α-butyl-β-3,4,5-trihydroxyphenylpropionic acid; α-hydrazino-α-butyl-β-2,4,5-trihydroxyphenylpropionic acid; α-hydrazino-α-butyl-β-2,3,4-trihydroxyphenylpropionic acid; α-hydrazino-α-β-dimethyl-β-3-hydroxyphenylpropionic acid; α-hydrazino-α,β-dimethyl-β-4-hydroxyphenylpropionic acid; α-hydrazino-α,β-dimethyl-β-3,4-hydroxyphenylpropionic acid; α-hydrazino-α-β-dimethyl-β-2,3-dihydroxyphenylpropionic acid; α-hydrazino-α,β-dimethyl-β-2,4-dihydroxyphenylpropionic acid; α-hydrazino-α,β-dimethyl-β-2,5-dihydroxyphenylpropionic acid; α-hydrazino-α-β-dimethyl-β-3,4,5-trihydroxyphenylpropionic acid; α-hydrazino-α-β-dimethyl-β-2,4,5-trihydroxyphenylpropionic acid; α-hydrazino-α-β-dimethyl-β-2,3,4-trihydroxyphenylpropionic acid; α-hydrazino-α-ethyl-β-methyl-β-3-hydroxyphenylpropionic acid; α-hydrazino-α-ethyl-β-methyl-β-4-hydroxyphenylpropionic acid; α-hydrazino-α-ethyl-β-methyl-β-3,4-hydroxyphenylpropionic acid; α-hydrazino-α-ethyl-β-methyl-β-2,3-dihydroxyphenylpropionic acid; α-hydrazino-α-ethyl-β-methyl-β-2,4-dihydroxyphenylpropionic acid; α-hydrazino-α-ethyl-β-methyl-β-2,5-dihydroxyphenylpropionic acid; α-hydrazino-α-ethyl-β-methyl-3,4,5-trihydroxyphenylpropionic acid; α-hydrazino-α-ethyl-β-methyl-β-2,4,5-trihydroxyphenylpropionic acid; α-hydrazino-α-ethyl-β-methyl-β-2,3,4-trihydroxyphenylpropionic acid; α-hydrazino-α-methyl-β-ethyl-β-3-hydroxyphenylpropionic acid; α-hydrazino-α-methyl-β-ethyl-β-4-hydroxyphenylpropionic acid; α-hydrazino-α-methyl-β-ethyl-β-3,4-hydroxyphenylpropionic acid; α-hydrazino-α-methyl-β-ethyl-β-2,3-dihydroxyphenylpropionic acid; α-hydrazino-α-methyl-β-ethyl-β-2,5-dihydroxyphenylpropionic acid; α-hydrazino-α-methyl-β-ethyl-β-3,4,5-trihydroxyphenylpropionic acid; α-hydrazino-α-methyl-β-ethyl-β-2,4,5-trihydroxyphenylpropionic acid; $N^2$-isopropylidenyl-α-hydrazino-α-methyl-β-(3,4-dihydroxyphenyl) propionic acid; $N^2$-isopropyl-α-hydrazino-α-methyl-β-(3,4-dihydroxyphenyl) propionic acid; α-hydrazino-α-methyl-β-3,4-dihydroxyphenylpropionic acid ethyl ester; α-hydrazino-α-methyl-β-3,4-dihydroxyphenylpropionic acid ethyl ester; α-hydrazino-α-methyl-β-3,4-dihydroxyphenylpropionic acid ethyl ester hydrochloride; α-hydrazino-α-ethyl-β-3,4-dihydroxyphenylpropionic acid; α-hydrazino-α,β-dimethyl-β-3,4-dihydroxyphenylpropionic acid; α-hydrazino-β-(3,4-dihydroxyphenyl) propionic acid; α-hydrazino-β-(3-hydroxyphenyl) propionic acid; and α-hydrazino-β-(4-hydroxyphenyl) propionic acid.

14. The method of any one of paragraphs 1, 2, and 4 to 8, wherein the compound is of Formula I and is seryl-(2,3,4-trihydroxybenzyl)-hydrazide (benserazide), L-benserazide (S-enantiomer), D,L-benserazide (R,S-enantiomer), or D-benserazide (R-enantiomer).

15. The method of any one of paragraphs 1 and 3 to 8, wherein the compound is of Formula II and is α-hydrazino-α-methyl-β-2,4-dihydroxyphenylpropionic acid (carbidopa).

16. The method of any one of paragraphs 1 to 15, wherein the compound of Formula I or the compound of Formula II is present in the same composition as an anti-psychotic drug when administered to the subject.

17. The method of any one of paragraphs 1-3, 5, 6, and 8-16, wherein the aspect of metabolic syndrome to be prevented or treated is selected from the group consisting of high blood pressure, high blood sugar, insulin resistance, excess body fat around the waist, and dyslipidemia.

18. The method of paragraph 17, wherein the feature of dyslipidemia to be prevented or treated is selected from the group consisting of high cholesterol levels, high serum triglyceride levels, and low high-density lipoprotein levels.

19. The method of any one of paragraphs 1 to 18, wherein the subject is under treatment with: (a) an atypical antipsychotic drug, optionally selected from the group consisting of a benzamide, benzisoxazole/benzisothiazole, butyrophenone, phenylpiperazine/quinolinone, and tricyclic; or (b) a typical anti-psychotic, optionally selected from the group consisting of a butyrophenone, diphenylbutylpiperidine, phenothiazine, and thioxanthene.

20. The method of paragraph 19, wherein the benzamide is selected from the group consisting of amisulpride, nemonapride, remoxipride, and sultopride; the benzisoxazole/benzisothiazole is selected from the group consisting of iloperidone, lurasicone, paliperidone, paliperidone palmitate, perospirone, risperidone, and ziprasidone; the butyrophenone is melperone; the phenylpiperazine/quinolinone is selected from the group consisting of aripiprazole, aripiprazole lauroxil, brexpiprazole, and cariprazine; or the tricyclic is selected from the group consisting of asenapin, clozapine, olanzapine, quetiapine, and zotepine.

21. The method of paragraph 19, wherein the butyrophenone is selected from the group consisting of benperidol, bromperidol, droperidol, haloperidol, and timiperone; the diphenylbutylpiperidine is selected from the group consisting of fluspirilene, penfluridol, and pimozide; the phenothiazine is selected from the group consisting of chlorpromazine, cyamemazine, dixyrazine, fluphenazine, levomepromazine, perazine, pericyazine, perphenazine, pipotiazine, prochlorperazine, promethazine, prothipendyl, thioproperazine, and trifluoperazine; or the thioxanthene is selected from the group consisting of chlorprothixene, clopenthixol, flupentixol, thiothixene, and zuclopenthixol.

22. The method of any one of paragraphs 1 to 21, wherein the subject has or is at risk of developing schizophrenia, schizoaffective disorder, bipolar disorder, psychotic depression, treatment-resistant depression, or other conditions requiring administration of an anti-psychotic drug.

23. The method of any one of paragraphs 1 to 22, further comprising administration of an antidiabetic drug to the subject.

24. The method of paragraph 23, wherein the antidiabetic drug is selected from the group consisting of a biguanide, dopamine agonist, DPP-4 inhibitor, glucagon-like peptide, meglitinide, sodium glucose transporter (SGLT) 2 inhibitor, sulfonylurea, and thiazolidinedione, and combinations thereof.

25. The method of paragraph 24, wherein the antidiabetic drug is selected from the group consisting of metformin, bromocriptine, alogliptin, linagliptin, saxagliptin, sitagliptin, albiglutide, dulaglutide, exenatide, exenitide extended-release, liragludite, nateglinide, repaglinide, dapagliflozin, canagliflozin, empagliflozin, glimepiride, gliclazide, glipizide, glyburide, chlorpropamide, tolazamide, tolbutamide, rosiglitazone, and pioglitazone.

26. The method of any one of paragraphs 23 to 25, wherein the compound of Formula I or the compound of Formula II is present in the same composition as the antidiabetic drug when administered to the subject.

27. A pharmaceutical composition comprising a compound of Formula I or a compound of Formula II, as set forth in paragraph 1, or a pharmaceutically acceptable salt thereof, and an anti-psychotic drug.

28. The pharmaceutical composition of paragraph 27, wherein the compound of Formula I is selected from the group consisting of seryl-(3,4-dihydroxylbenzyl)-hydrazide, seryl-(2,3,4-trihydroxybenzyl)-hydrazide, threonyl-(2,3,4-trihydroxybenzyl))-hydrazide, alanyl-(2,3,4-trihydroxybenzyl)-hydrazide, and 2,3,4-trihydroxybenzyl-hydrazine.

29. The pharmaceutical composition of paragraph 27 or 28, wherein the compound of Formula II is selected from the group consisting of α-hydrazino-β-phenylpropionic acid; α-hydrazino-α-methyl-β-phenylpropionic acid; α-hydrazino-β-3-hydroxyphenylpropionic acid; α-hydrazino-α-methyl-β-3-hydroxyphenylpropionic acid; α-hydrazino-α-methyl-β-4-hydroxyphenylpropionic acid; α-hydrazino-β-3,4-dihydroxyphenylpropionic acid; α-hydrazino-α-methyl-β-3,4-dihydroxyphenylpropionic acid; α-hydrazino-α-methyl-β-2,3-dihydroxyphenylpropionic acid; α-hydrazino-α-methyl-β-2,4-dihydroxyphenylpropionic acid; α-hydrazino-α-methyl-β-3-hydroxy-4-methylphenylpropionic acid; α-hydrazino-α-methyl-β-3-hydroxy-4-chlorophenylpropionic acid; α-hydrazino-α-methyl-β-3-hydroxy-4-bromophenylpropionic acid; α-hydrazino-α-methyl-β-3-hydroxy-4-fluorophenylpropionic acid; α-hydrazino-α-methyl-β-3-hydroxy-4-trifluoromethylpropionic acid; α-hydrazino-α-methyl-β-3-hydroxy-4-ethylphenylpropionic acid; α-hydrazino-α-methyl-β-2,5-dihydroxyphenylpropionic acid; α-hydrazino-α-methyl-β-3,4,5-trihydroxyphenylpropionic acid; α-hydrazino-α-methyl-β-2,4,5-trihydroxyphenylpropionic acid; α-hydrazino-α-methyl-β-2,3,4-trihydroxyphenylpropionic acid; α-hydrazino-α-ethyl-β-3-hydroxyphenylpropionic acid; α-hydrazino-α-ethyl-β-4-hydroxyphenylpropionic acid; α-hydrazino-α-ethyl-β-3,4-hydroxyphenylpropionic acid; α-hydrazino-α-ethyl-β-2,3-dihydroxyphenylpropionic acid; α-hydrazino-α-ethyl-β-2,5-dihydroxyphenylpropionic acid; α-hydrazino-α-ethyl-β-2,4-dihydroxyphenylpropionic acid; α-hydrazino-α-ethyl-β-3,4,5-trihydroxyphenylpropionic acid; α-hydrazino-α-ethyl-β-2,4,5-trihydroxyphenylpropionic acid; α-hydrazino-α-ethyl-β-2,3,4-trihydroxyphenylpropionic acid; α-hydrazino-α-propyl-β-3-hydroxyphenylpropionic acid; α-hydrazino-α-propyl-β-4-hydroxyphenylpropionic acid; α-hydrazino-α-propyl-β-3,4-hydroxyphenylpropionic acid; α-hydrazino-α-propyl-β-2,3-dihydroxyphenylpropionic acid; α-hydrazino-α-propyl-β-2,4-dihydroxyphenylpropionic acid; α-hydrazino-α-propyl-β-2,5-dihydroxyphenylpropionic acid; α-hydrazino-α-propyl-β-3,4,5-trihydroxyphenylpropionic acid; α-hydrazino-α-propyl-β-2,4,5-trihydroxyphenylpropionic acid; α-hydrazino-α-propyl-β-2,3,4-trihydroxyphenylpropionic acid; α-hydrazino-α-butyl-β-3-hydroxyphenylpropionic acid; α-hydrazino-α-butyl-β-4-hydroxyphenylpropionic acid; α-hydrazino-α-butyl-β-3,4-hydroxyphenylpropionic acid; α-hydrazino-α-butyl-β-2,3-dihydroxyphenylpropionic acid; α-hydrazino-α-butyl-β-2,4-dihydroxyphenylpropionic acid; α-hydrazino-α-butyl-β-2,5-dihydroxyphenylpropionic acid; α-hydrazino-α-butyl-β-3,4,5-trihydroxyphenylpropionic acid; α-hydrazino-α-butyl-β-2,4,5-trihydroxyphenylpropionic acid; α-hydrazino-α-butyl-β-2,3,4-trihydroxyphenylpropionic acid; α-hydrazino-α,β-dimethyl-β-3-hydroxyphenylpropionic acid; α-hydrazino-α,β-dimethyl-β-4-hydroxyphenylpropionic acid; α-hydrazino-α,β-dimethyl-β-3,4-hydroxyphenylpropionic acid; α-hydrazino-α-β-dimethyl-β-2,3-dihydroxyphenylpropionic acid; α-hydrazino-α,β-dimethyl-β-2,4-dihydroxyphenylpropionic acid; α-hydrazino-α,β-dimethyl-β-2,5-dihydroxyphenylpropionic acid; α-hydrazino-α-β-dimethyl-β-3,4,5-trihydroxyphenylpropionic acid; α-hydrazino-α-β-dimethyl-β-2,4,5-trihydroxyphenylpropionic acid; α-hydrazino-α-β-dimethyl-β-2,3,4-trihydroxyphenylpropionic acid; α-hydrazino-α-ethyl-β-methyl-β-3-hydroxyphenylpropionic acid; α-hydrazino-α-ethyl-β-methyl-β-4-hydroxyphenylpropionic acid; α-hydrazino-α-ethyl-β-methyl-β-3,4-hydroxyphenylpropionic acid; α-hydrazino-α-ethyl-β-methyl-β-2,3-dihydroxyphenylpropionic acid; α-hydrazino-α- ethyl-β-methyl-β-2,4-dihydroxyphenylpropionic acid; α-hydrazino-α-ethyl-β-methyl-β-2,5-dihydroxyphenylpropionic acid; α-hydrazino-α-ethyl-β-methyl-3,4,5-trihydroxyphenylpropionic acid; α-hydrazino-α-ethyl-β-methyl-β-2,4,5-trihydroxyphenylpropionic acid; α-hydrazino-α-ethyl-β-methyl-β-2,3,4-trihydroxyphenylpropionic acid; α-hydrazino-α-methyl-β-ethyl-β-3-hydroxyphenylpropionic acid; α-hydrazino-α-methyl-β-ethyl-β-4-hydroxyphenylpropionic acid; α-hydrazino-α-methyl-β-ethyl-β-3,4-hydroxyphenylpropionic acid; α-hydrazino-α-methyl-β-ethyl-β-2,3-dihydroxyphenylpropionic acid; α-hydrazino-α-methyl-β-ethyl-β-2,5-dihydroxyphenylpropionic acid; α-hydrazino-α-methyl-β-ethyl-β-3,4,5-trihydroxyphenylpropionic acid; α-hydrazino-α-methyl-β-ethyl-β-2,4,5-trihydroxyphenylpropionic acid; $N^2$-isopropylidenyl-α-hydrazino-α-methyl-β-(3,4-dihydroxyphenyl) propionic acid; $N^2$-isopropyl-α-hydrazino-α-methyl-β-(3,4-dihydroxyphenyl) propionic acid; α-hydrazino-α-methyl-β-3,4-dihydroxyphenylpropionic acid ethyl ester; α-hydrazino-α-methyl-β-3,4-dihydroxyphenylpropionic acid ethyl ester; α-hydrazino-α-methyl-β-3,4-dihydroxyphenylpropionic acid ethyl ester hydrochloride; α-hydrazino-α-ethyl-β-3,4-dihydroxyphenylpropionic acid; α-hydrazino-α,β-dimethyl-β-3,4-dihydroxyphenylpropionic acid; α-hydrazino-β-(3,4-dihydroxyphenyl) propionic acid; α-hydrazino-β-(3-hydroxyphenyl) propionic acid; and α-hydrazino-β-(4-hydroxyphenyl) propionic acid.

30. The pharmaceutical composition of any one of paragraphs 27 to 29, wherein the compound of Formula I is seryl-(2,3,4-trihydroxybenzyl)-hydrazide (benserazide), L-benserazide (S-enantiomer), D,L-benserazide (R,S-enantiomer), or D-benserazide (R-enantiomer).

31. The pharmaceutical composition of any one of paragraphs 27 to 30, wherein the compound of Formula II is α-hydrazino-α-methyl-β-2,4-dihydroxyphenylpropionic acid (carbidopa).

32. The pharmaceutical composition of any one of paragraphs 27 to 31, wherein the anti-psychotic drug is selected from: (a) an atypical anti-psychotic drug, optionally selected from the group consisting of a benzamide, benzisoxazole/benzisothiazole, butyrophenone, phenylpiperazine/quinolinone, and tricyclic; or (b) a typical anti-psychotic, optionally selected from the group consisting of a butyrophenone, diphenylbutylpiperidine, phenothiazine, and thioxanthene.

33. The pharmaceutical composition of paragraph 32, wherein the benzamide is selected from the group consisting of amisulpride, nemonapride, remoxipride, and sultopride; the benzisoxazole/benzisothiazole is selected from the group consisting of iloperidone, lurasicone, paliperidone, paliperidone palmitate, perospirone, risperidone, and ziprasidone; the butyrophenone is melperone; the phenylpiperazine/quinolinone is selected from the group consisting of aripiprazole, aripiprazole lauroxil, brexpiprazole, and cariprazine; or the tricyclic is selected from the group consisting of asenapin, clozapine, olanzapine, quetiapine, and zotepine.

34. The pharmaceutical composition of paragraph 32, wherein the butyrophenone is selected from the group consisting of benperidol, bromperidol, droperidol, haloperidol, and timiperone; the diphenylbutylpiperidine is selected from the group consisting of fluspirilene, penfluridol, and pimozide; the phenothiazine is selected from the group consisting of chlorpromazine, cyamemazine, dixyrazine, fluphenazine, levomepromazine, perazine, pericyazine, perphenazine, pipotiazine, prochlorperazine, promethazine, prothipendyl, thioproperazine, and trifluoperazine; or the thioxanthene is selected from the group consisting of chlorprothixene, clopenthixol, flupentixol, thiothixene, and zuclopenthixol.

35. The pharmaceutical composition of any one of paragraphs 27 to 34, which is comprised within a tablet, capsule, nanoparticles, or liposomes.

36. The pharmaceutical composition of any one of paragraphs 27 to 35, further comprising an antidiabetic drug.

37. The pharmaceutical composition of paragraph 36, wherein the antidiabetic drug is selected from the group consisting of a biguanide, dopamine agonist, DPP-4 inhibitor, glucagon-like peptide, meglitinide, sodium glucose transporter (SGLT) 2 inhibitor, sulfonylurea, and thiazolidinedione, and combinations thereof.

38. The pharmaceutical composition of paragraph 37, wherein the antidiabetic drug is selected from the group consisting of metformin, bromocriptine, alogliptin, linagliptin, saxagliptin, sitagliptin, albiglutide, dulaglutide, exenatide, exenitide extended-release, liragludite, nateglinide, repaglinide, dapagliflozin, canagliflozin, empagliflozin, glimepiride, gliclazide, glipizide, glyburide, chlorpropamide, tolazamide, tolbutamide, rosiglitazone, and pioglitazone.

Other embodiments are within the scope of the claims.

What is claimed is:

1. A method for preventing or treating metabolic syndrome induced by an anti-psychotic medication in a subject in need thereof, the method comprising administering to the subject:

(a) a compound of Formula I:

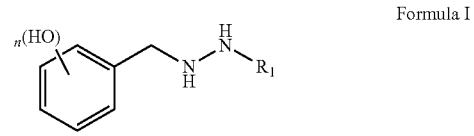

Formula I or a pharmaceutically-acceptable salt thereof, wherein $R_1$ is selected from the group consisting of hydrogen and amino-substituted acyl, and n is a whole integer from 2 to 3, and optionally the compound of Formula I is selected from the S enantiomer, the R enantiomer, and a racemic mixture of the compound; or (b) a compound of Formula II:

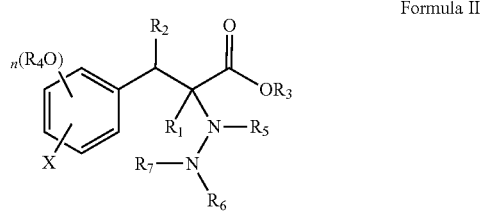

Formula II or a pharmaceutically-acceptable salt thereof, wherein $R_1$, $R_2$, and $R_3$ are each independently hydrogen or lower alkyl, $R_4$ and $R_5$ are independently hydrogen or lower alkanoyl, $R_6$ is hydrogen, lower alkanoyl, lower alkyl, or together with $R_7$ lower alkylidenyl, $R_7$ is hydrogen, lower alkyl, or together with $R_6$ lower alkylidenyl; n is a whole integer from 0 to 3, and X is selected from the group consisting of hydrogen, alkyl, halogen, and trifluoromethyl, X being para to the acidic side chain when other than hydrogen, and optionally the compound of Formula II is selected from the S enantiomer, the R enantiomer, and a racemic mixture of the compound.

2. The method of claim 1, wherein the compound is of Formula I and $R_1$ is an alpha-amino acyl or a beta-amino acyl, wherein optionally $R_1$ is an amino-lower alkanoyl or a hydroxy-substituted amino-lower alkanoyl, wherein optionally $R_1$ is selected from seryl, threonyl, alanyl, and beta-amino-propionyl.

3. The method of claim 1, wherein the compound is of Formula I and is selected from the group consisting of seryl-(3,4-dihydroxylbenzyl)-hydrazide, seryl-(2,3,4-trihydroxybenzyl)-hydrazide, threonyl-(2,3,4-trihydroxybenzyl))-hydrazide, alanyl-(2,3,4-trihydroxybenzyl)-hydrazide, and 2,3,4-trihydroxybenzyl-hydrazine.

4. The method of claim 1, wherein the compound is of Formula II and is selected from the group consisting of α-hydrazino-β-phenylpropionic acid; α-hydrazino-α-methyl-β-phenylpropionic acid; α-hydrazino-β-3-hydroxyphenylpropionic acid; α-hydrazino-α-methyl-β-3-hydroxyphenylpropionic acid; α-hydrazino-α-methyl-β-4-hydroxyphenylpropionic acid; α-hydrazino-β-3,4-dihydroxyphenylpropionic acid; α-hydrazino-α-methyl-β-3,4-dihydroxyphenylpropionic acid; α-hydrazino-α-methyl-β-2,3-dihydroxyphenylpropionic acid; α-hydrazino-α-methyl-β-2,4-dihydroxyphenylpropionic acid; α-hydrazino-α-methyl-β-3-hydroxy-4-methylphenylpropionic acid; α-hydrazino-α-methyl-β-3-hydroxy-4-chlorophenylpropionic acid; α-hydrazino-α-methyl-β-3-hydroxy-4-bromophenylpropionic acid; α-hydrazino-α-methyl-β-3-hydroxy-4-fluorophenylpropionic acid; α-hydrazino-α-methyl-β-3-hydroxy-4-trifluoromethylpropionic acid; α-hydrazino-α-methyl-β-3-hydroxy-4-ethylphenylpropionic acid; α-hydrazino-α-methyl-β-2,5-dihydroxyphenylpropionic acid; α-hydrazino-α-methyl-β-3,4,5-trihydroxyphenylpropionic acid; α-hydrazino-α-methyl-β-2,4,5-trihydroxyphenylpropionic acid; α-hydrazino-α-methyl-β-2,3,4-trihydroxyphenylpropionic acid; α-hydrazino-α-ethyl-β-3-hydroxyphenylpropionic acid; α-hydrazino-α-ethyl-β-4-hydroxyphenylpropionic acid; α-hydrazino-α-ethyl-β-3,4-hydroxyphenylpropionic acid; α-hydrazino-α-ethyl-β-2,3-dihydroxyphenylpropionic acid; α-hydrazino-α-ethyl-β-2,5-dihydroxyphenylpropionic acid; α-hydrazino-α-ethyl-β-2,4-dihydroxyphenylpropionic acid; α-hydrazino-α-ethyl-β-3,4,5-trihydroxyphenylpropionic acid; α-hydrazino-α-ethyl-β-2,4,5-trihydroxyphenylpropionic acid; α-hydrazino-α-ethyl-β-2,3,4-trihydroxyphenylpropionic acid; α-hydrazino-α-propyl-β-3-hydroxyphenylpropionic acid; α-hydrazino-α-propyl-β-4-hydroxyphenylpropionic acid; α-hydrazino-α-propyl-β-3,4-hydroxyphenylpropionic acid; α-hydrazino-α-propyl-β-2,3-dihydroxyphenylpropionic acid; α-hydrazino-α-propyl-β-2,4-dihydroxyphenylpropionic acid; α-hydrazino-α-propyl-β-2,5-dihydroxyphenylpropionic acid; α-hydrazino-α-propyl-β-3,4,5-trihydroxyphenylpropionic acid; α-hydrazino-α-propyl-β-2,4,5-trihydroxyphenylpropionic acid; α-hydrazino-α-propyl-β-2,3,4-trihydroxyphenylpropionic acid; α-hydrazino-α-butyl-β-3-hydroxyphenylpropionic acid; α-hydrazino-α-butyl-β-4-hydroxyphenylpropionic acid; α-hydrazino-α-butyl-β-3,4-hydroxyphenylpropionic acid; α-hydrazino-α-butyl-β-2,3-dihydroxyphenylpropionic acid; α-hydrazino-α-butyl-β-2,4-dihydroxyphenylpropionic acid; α-hydrazino-α-butyl-β-2,5-dihydroxyphenylpropionic acid; α-hydrazino-α-butyl-β-3,4,5-trihydroxyphenylpropionic acid; α-hydrazino-α-butyl-β-2,4,5-trihydroxyphenylpropionic acid; α-hydrazino-α-butyl-β-2,3,4-trihydroxyphenylpropionic acid; α-hydrazino-α,β-dimethyl-β-3-hydroxyphenylpropionic acid; α-hydrazino-α,β-dimethyl-β-4-hydroxyphenylpropionic acid; α-hydrazino-α,β-dimethyl-β-3,4-hydroxyphenylpropionic acid; α-hydrazino-α-β-dimethyl-β-2,3-dihydroxyphenylpropionic acid; α-hydrazino-α,β-dimethyl-β-2,4-dihydroxyphenylpropionic acid; α-hydrazino-α,β-dimethyl-β-2,5-dihydroxyphenylpropionic acid; α-hydrazino-α-β-dimethyl-β-3,4,5-trihydroxyphenylpropionic acid; α-hydrazino-α-β-dimethyl-β-2,4,5-trihydroxyphenylpropionic acid; α-hydrazino-α-β-dimethyl-β-2,3,4-trihydroxyphenylpropionic acid; α-hydrazino-α-ethyl-β-methyl-β-3-hydroxyphenylpropionic acid; α-hydrazino-α-ethyl-β-methyl-β-4-hydroxyphenylpropionic acid; α-hydrazino-α-ethyl-β-methyl-β-3,4-hydroxyphenylpropionic acid; α-hydrazino-α-ethyl-β-methyl-β-2,3-dihydroxyphenylpropionic acid; α-hydrazino-α-ethyl-β-methyl-β-2,4-dihydroxyphenylpropionic acid; α-hydrazino-α-ethyl-β-methyl-β-2,5-dihydroxyphenylpropionic acid; α-hydrazino-α-ethyl-β-methyl-3,4,5-trihydroxyphenylpropionic acid; α-hydrazino-α-ethyl-β-methyl-β-2,4,5-trihydroxyphenylpropionic acid; α-hydrazino-α-ethyl-β-methyl-β-2,3,4-trihydroxyphenylpropionic acid; α-hydrazino-α-methyl-β-ethyl-β-3-hydroxyphenylpropionic acid; α-hydrazino-α-methyl-β-ethyl-β-4-hydroxyphenylpropionic acid; α-hydrazino-α-methyl-β-ethyl-β-3,4-hydroxyphenylpropionic acid; α-hydrazino-α-methyl-β-ethyl-β-2,3-dihydroxyphenylpropionic acid; α-hydrazino-α-methyl-β-ethyl-β-2,5-dihydroxyphenylpropionic acid; α-hydrazino-α-methyl-β-ethyl-β-3,4,5-trihydroxyphenylpropionic acid; α-hydrazino-α-methyl-β-ethyl-β-2,4,5-trihydroxyphenylpropionic acid; $N^2$-isopropylidenyl-α-hydrazino-α-methyl-β-(3,4-dihydroxyphenyl) propionic acid; $N^2$-isopropyl-α-hydrazino-α-methyl-β-(3,4-dihydroxyphenyl) propionic acid; α-hydrazino-α-methyl-β-3,4-dihydroxyphenylpropionic acid ethyl ester; α-hydrazino-α-methyl-β-3,4-dihydroxyphenylpropionic acid ethyl ester; α-hydrazino-α-methyl-β-3,4-dihydroxyphenylpropionic acid ethyl ester hydrochloride; α-hydrazino-α-ethyl-β-3,4-dihydroxyphenylpropionic acid; α-hydrazino-α,β-dimethyl-β-3,4-dihydroxyphenylpropionic acid; α-hydrazino-β-(3,4-dihydroxyphenyl) propionic acid; α-hydrazino-β-(3-hydroxyphenyl) propionic acid; and α-hydrazino-β-(4-hydroxyphenyl) propionic acid.

5. The method of claim 1, wherein the compound is of Formula I and is seryl-(2,3,4-trihydroxybenzyl)-hydrazide (benserazide), L-benserazide (S-enantiomer), D,L-benserazide (R,S-enantiomer), or D-benserazide (R-enantiomer).

6. The method of claim 1, wherein the compound is of Formula II and is α-hydrazino-α-methyl-β-2,4-dihydroxyphenylpropionic acid (carbidopa).

7. The method of claim 1, wherein the compound of Formula I or the compound of Formula II is present in the same composition as an anti-psychotic drug when administered to the subject.

8. The method of claim 1, wherein the aspect of metabolic syndrome to be prevented or treated is selected from the group consisting of high blood pressure, high blood sugar, insulin resistance, excess body fat around the waist, and dyslipidemia, wherein optionally the feature of dyslipidemia to be prevented or treated is selected from the group consisting of high cholesterol levels, high serum triglyceride levels, and low high-density lipoprotein levels.

9. The method of claim 1, wherein the subject is under treatment with: (a) an atypical anti-psychotic drug; or (b) a typical anti-psychotic drug.

10. The method of claim 1, wherein the subject has or is at risk of developing schizophrenia, schizoaffective disorder, bipolar disorder, psychotic depression, treatment-resistant depression, or other conditions requiring administration of an anti-psychotic drug.

11. The method of claim 1, further comprising administration of an antidiabetic drug to the subject.

12. A pharmaceutical composition comprising:
(I)(a) a compound of Formula I:

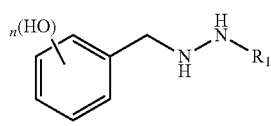

Formula I or a pharmaceutically-acceptable salt thereof, wherein $R_1$ is selected from the group consisting of hydrogen and amino-substituted acyl, and n is a whole integer from 2 to 3, and optionally the compound of Formula I is selected from the S enantiomer, the R enantiomer, and a racemic mixture of the compound; or (b) a compound of Formula II:

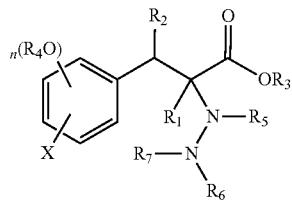

Formula II or a pharmaceutically-acceptable salt thereof, wherein $R_1$, $R_2$, and $R_3$ are each independently hydrogen or lower alkyl, $R_4$ and $R_5$ are independently hydrogen or lower alkanoyl, $R_6$ is hydrogen, lower alkanoyl, lower alkyl, or together with $R_7$ lower alkylidenyl, $R_7$ is hydrogen, lower alkyl, or together with $R_6$ lower alkylidenyl; n is a whole integer from 0 to 3, and X is selected from the group consisting of hydrogen, alkyl, halogen, and trifluoromethyl, X being para to the acidic side chain when other than hydrogen, and optionally the compound of Formula II is selected from the S enantiomer, the R enantiomer, and a racemic mixture of the compound; and (II) an anti-psychotic drug or an antidiabetic drug.

13. The pharmaceutical composition of claim 12, wherein the compound of Formula I is selected from the group consisting of seryl-(3,4-dihydroxylbenzyl)-hydrazide, seryl-(2,3,4-trihydroxybenzyl)-hydrazide, threonyl-(2,3,4-trihydroxybenzyl))-hydrazide, alanyl-(2,3,4-trihydroxybenzyl))-hydrazide, and 2,3,4-trihydroxybenzyl-hydrazine.

14. The pharmaceutical composition of claim 12, wherein the compound of Formula II is selected from the group consisting of α-hydrazino-β-phenylpropionic acid; α-hydrazino-α-methyl-β-phenylpropionic acid; α-hydrazino-β-3-hydroxyphenylpropionic acid; α-hydrazino-α-methyl-β-3-hydroxyphenylpropionic acid; α-hydrazino-α-methyl-β-4-hydroxyphenylpropionic acid; α-hydrazino-β-3,4-dihydroxyphenylpropionic acid; α-hydrazino-α-methyl-β-3,4-dihydroxyphenylpropionic acid; α-hydrazino-α-methyl-β-2,3-dihydroxyphenylpropionic acid; α-hydrazino-α-methyl-β-2,4-dihydroxyphenylpropionic acid; α-hydrazino-α-methyl-β-3-hydroxy-4-methylphenylpropionic acid; α-hydrazino-α-methyl-β-3-hydroxy-4-chlorophenylpropionic acid; α-hydrazino-α-methyl-β-3-hydroxy-4-bromophenylpropionic acid; α-hydrazino-α-methyl-β-3-hydroxy-4-fluorophenylpropionic acid; α-hydrazino-α-methyl-β-3-hydroxy-4-trifluoromethylpropionic acid; α-hydrazino-α-methyl-β-3-hydroxy-4-ethylphenylpropionic acid; α-hydrazino-α-methyl-β-2,5-dihydroxyphenylpropionic acid; α-hydrazino-α-methyl-β-3,4,5-trihydroxyphenylpropionic acid; α-hydrazino-α-methyl-β-2,4,5-trihydroxyphenylpropionic acid; α-hydrazino-α-methyl-β-2,3,4-trihydroxyphenylpropionic acid; α-hydrazino-α-ethyl-β-3-hydroxyphenylpropionic acid; α-hydrazino-α-ethyl-β-4-hydroxyphenylpropionic acid; α-hydrazino-α-ethyl-β-3,4-hydroxyphenylpropionic acid; α-hydrazino-α-ethyl-β-2,3-dihydroxyphenylpropionic acid; α-hydrazino-α-ethyl-β-2,5-dihydroxyphenylpropionic acid; α-hydrazino-α-ethyl-β-2,4-dihydroxyphenylpropionic acid; α-hydrazino-α-ethyl-β-3,4,5-trihydroxyphenylpropionic acid; α-hydrazino-α-ethyl-β-2,4,5-trihydroxyphenylpropionic acid; α-hydrazino-α-ethyl-β-2,3,4-trihydroxyphenylpropionic acid; α-hydrazino-α-propyl-β-3-hydroxyphenylpropionic acid; α-hydrazino-α-propyl-β-4-hydroxyphenylpropionic acid; α-hydrazino-α-propyl-β-3,4-hydroxyphenylpropionic acid; α-hydrazino-α-propyl-β-2,3-dihydroxyphenylpropionic acid; α-hydrazino-α-propyl-β-2,4-dihydroxyphenylpropionic acid; α-hydrazino-α-propyl-β-2,5-dihydroxyphenylpropionic acid; α-hydrazino-α-propyl-β-3,4,5-trihydroxyphenylpropionic acid; α-hydrazino-α-propyl-β-2,4,5-trihydroxyphenylpropionic acid; α-hydrazino-α-propyl-β-2,3,4-trihydroxyphenylpropionic acid; α-hydrazino-α-butyl-β-3-hydroxyphenylpropionic acid; α-hydrazino-α-butyl-β-4-hydroxyphenylpropionic acid; α-hydrazino-α-butyl-β-3,4-hydroxyphenylpropionic acid; α-hydrazino-α-butyl-β-2,3-dihydroxyphenylpropionic acid; α-hydrazino-α-butyl-β-2,4-dihydroxyphenylpropionic acid; α-hydrazino-α-butyl-β-2,5-dihydroxyphenylpropionic acid; α-hydrazino-α-butyl-β-3,4,5-trihydroxyphenylpropionic acid; α-hydrazino-α-butyl-β-2,4,5-trihydroxyphenylpropionic acid; α-hydrazino-α-butyl-β-2,3,4-trihydroxyphenylpropionic acid; α-hydrazino-α,β-dimethyl-β-3-hydroxyphenylpropionic acid; α-hydrazino-α,β-dimethyl-β-4-hydroxyphenylpropionic acid; α-hydrazino-α,β-dimethyl-β-3,4-hydroxyphenylpropionic acid; α-hydrazino-α-β-dimethyl-β-2,3-dihydroxyphenylpropionic acid; α-hydrazino-α,β-dimethyl-β-2,4-dihydroxyphenylpropionic acid; α-hydrazino-α,β-dimethyl-β-2,5-dihydroxyphenylpropionic acid; α-hydrazino-α-β-dimethyl-β-3,4,5-trihydroxyphenylpropionic acid; α-hydrazino-α-β-dimethyl-β-2,4,5-trihydroxyphenylpropionic acid; α-hydrazino-α-β-dimethyl-β-2,3,4-trihydroxyphenylpropionic acid; α-hydrazino-α-ethyl-β-methyl-β-3-hydroxyphenylpropionic acid; α-hydrazino-α-ethyl-β-methyl-β-4-hydroxyphenylpropionic acid; α-hydrazino-α-ethyl-β-methyl-β-3,4-hydroxyphenylpropionic acid; α-hydrazino-α-ethyl-β-methyl-β-2,3-dihydroxyphenylpropionic acid; α-hydrazino-α-ethyl-β-methyl-β-2,4-dihydroxyphenylpropionic acid; α-hydrazino-α-ethyl-β-methyl-β-2,5-dihydroxyphenylpropionic acid; α-hydrazino-α-ethyl-β-methyl-3,4,5-trihydroxyphenylpropionic acid; α-hydrazino-α-ethyl-β-methyl-β-2,4,5-trihydroxyphenylpropionic acid; α-hydrazino-α-ethyl-β-methyl-β-2,3,4-trihydroxyphenylpropionic acid; α-hydrazino-α-methyl-β-ethyl-β-3-hydroxyphenylpropionic acid; α-hydrazino-α-methyl-β-ethyl-β-4-hydroxyphenylpropionic acid; α-hydrazino-α-methyl-β-ethyl-β-3,4-hydroxyphenylpropionic acid; α-hydrazino-α-methyl-β-ethyl-β-2,3-dihydroxyphenylpropionic acid; α-hydrazino-α-methyl-β-ethyl-β-2,5-dihydroxyphenylpropionic acid; α-hydrazino-α-methyl-β-ethyl-β-3,4,5-trihydroxyphenylpropionic acid; α-hydrazino-α-methyl-β-ethyl-β-2,4,5-trihydroxyphenylpropionic acid; N²-isopropylidenyl-α-hydrazino-α-methyl-β-(3,4-dihydroxyphenyl) propionic acid; N²-isopropyl-α-hydrazino-α-methyl-β-(3,4-dihydroxyphenyl) propionic acid; α-hydrazino-α-methyl-β-3,4-dihydroxyphenylpropionic acid ethyl ester; α-hydrazino-α-methyl-β-3,4-dihydroxyphenylpropionic acid ethyl ester; α-hydrazino-α-methyl-β-3,4-dihydroxyphenylpropionic acid ethyl ester hydrochloride; α-hydrazino-α-ethyl-β-3,4-dihydroxyphenylpropionic acid; α-hydrazino-α,β-dimethyl-β-3,4-dihydroxyphenylpropionic acid; α-hydrazino-β-(3,4-dihydroxyphenyl) propionic acid; α-hydrazino-β-(3-hydroxyphenyl) propionic acid; and α-hydrazino-β-(4-hydroxyphenyl) propionic acid.

15. The pharmaceutical composition of claim 12, wherein the compound of Formula I is seryl-(2,3,4-trihydroxybenzyl)-hydrazide (benserazide), L-benserazide (S-enantiomer), D,L-benserazide (R,S-enantiomer), or D-benserazide (R-enantiomer).

16. The pharmaceutical composition of claim 12, wherein the compound of Formula II is α-hydrazino-α-methyl-β-2,4-dihydroxyphenylpropionic acid (carbidopa).

17. The pharmaceutical composition of claim 12, wherein the anti-psychotic drug is selected from: (a) an atypical anti-psychotic drug and (b) a typical anti-psychotic drug.

18. The method of claim 9, wherein (a) the atypical anti-psychotic drug is selected from the group consisting of a benzamide, benzisoxazole/benzisothiazole, butyrophenone, phenylpiperazine/quinolinone, and tricyclic; or (b) the typical anti-psychotic is selected from the group consisting of a butyrophenone, diphenylbutylpiperidine, phenothiazine, and thioxanthene.

19. The method of claim 18, wherein the benzamide is selected from the group consisting of amisulpride, nemonapride, remoxipride, and sultopride; the benzisoxazole/benzisothiazole is selected from the group consisting of iloperidone, lurasicone, paliperidone, paliperidone palmitate, perospirone, risperidone, and ziprasidone; the butyrophenone is melperone; the phenylpiperazine/quinolinone is selected from the group consisting of aripiprazole, aripiprazole lauroxil, brexpiprazole, and cariprazine; or the tricyclic is selected from the group consisting of asenapin, clozapine, olanzapine, quetiapine, and zotepine; and
the butyrophenone is selected from the group consisting of benperidol, bromperidol, droperidol, haloperidol, and timiperone; the diphenylbutylpiperidine is selected from the group consisting of fluspirilene, penfluridol, and pimozide; the phenothiazine is selected from the group consisting of chlorpromazine, cyamemazine, dixyrazine, fluphenazine, levomepromazine, perazine, pericyazine, perphenazine, pipotiazine, prochlorperazine, promethazine, prothipendyl, thioproperazine, and trifluoperazine; or the thioxanthene is selected from the group consisting of chlorprothixene, clopenthixol, flupentixol, thiothixene, and zuclopenthixol.

20. The method of claim 11, wherein the antidiabetic drug is selected from the group consisting of a biguanide, dopamine agonist, DPP-4 inhibitor, glucagon-like peptide, meglitinide, sodium glucose transporter (SGLT) 2 inhibitor, sulfonylurea, and thiazolidinedione, and combinations thereof,
and further wherein the compound of Formula I or the compound of Formula II is present in the same or a different composition as the antidiabetic drug when administered to the subject.

21. The method of claim 20, wherein the antidiabetic drug is selected from the group consisting of metformin, bromocriptine, alogliptin, linagliptin, saxagliptin, sitagliptin, albiglutide, dulaglutide, exenatide, exenitide extended-release, liragludite, nateglinide, repaglinide, dapagliflozin, canagliflozin, empagliflozin, glimepiride, gliclazide, glipizide, glyburide, chlorpropamide, tolazamide, tolbutamide, rosiglitazone, and pioglitazone,
and further wherein the compound of Formula I or the compound of Formula II is present in the same or a different composition as the antidiabetic drug when administered to the subject.

22. The pharmaceutical composition of claim 12, wherein the pharmaceutical composition further comprises an antidiabetic drug, which is selected from the group consisting of a biguanide, dopamine agonist, DPP-4 inhibitor, glucagon-like peptide, meglitinide, sodium glucose transporter (SGLT) 2 inhibitor, sulfonylurea, and thiazolidinedione, and combinations thereof,
and further wherein the compound of Formula I or the compound of Formula II is present in the same or a different composition as the antidiabetic drug when administered to the subject.

23. The pharmaceutical composition of claim 22, wherein the antidiabetic drug is selected from the group consisting of metformin, bromocriptine, alogliptin, linagliptin, saxagliptin, sitagliptin, albiglutide, dulaglutide, exenatide, exenitide extended-release, liragludite, nateglinide, repaglinide, dapagliflozin, canagliflozin, empagliflozin, glimepiride, gliclazide, glipizide, glyburide, chlorpropamide, tolazamide, tolbutamide, rosiglitazone, and pioglitazone,
and further wherein the compound of Formula I or the compound of Formula II is present in the same or a different composition as the antidiabetic drug when administered to the subject.

24. The pharmaceutical composition of claim 17, wherein (a) the atypical anti-psychotic drug is selected from the group consisting of a benzamide, benzisoxazole/benzisothiazole, butyrophenone, phenylpiperazine/quinolinone, and tricyclic; or (b) the typical anti-psychotic is selected from the group consisting of a butyrophenone, diphenylbutylpiperidine, phenothiazine, and thioxanthene.

25. The pharmaceutical composition of claim 24, wherein the benzamide is selected from the group consisting of amisulpride, nemonapride, remoxipride, and sultopride; the benzisoxazole/benzisothiazole is selected from the group consisting of iloperidone, lurasicone, paliperidone, paliperidone palmitate, perospirone, risperidone, and ziprasidone; the butyrophenone is melperone; the phenylpiperazine/quinolinone is selected from the group consisting of aripiprazole, aripiprazole lauroxil, brexpiprazole, and cariprazine; or the tricyclic is selected from the group consisting of asenapin, clozapine, olanzapine, quetiapine, and zotepine; and
the butyrophenone is selected from the group consisting of benperidol, bromperidol, droperidol, haloperidol, and timiperone; the diphenylbutylpiperidine is selected from the group consisting of fluspirilene, penfluridol, and pimozide; the phenothiazine is selected from the group consisting of chlorpromazine, cyamemazine, dixyrazine, fluphenazine, levomepromazine, perazine, pericyazine, perphenazine, pipotiazine, prochlorperazine, promethazine, prothipendyl, thioproperazine, and trifluoperazine; or the thioxanthene is selected from the group consisting of chlorprothixene, clopenthixol, flupentixol, thiothixene, and zuclopenthixol.

26. The method of claim 1, wherein the compound of Formula I or the compound of Formula II is administered to the subject as the sole therapeutic agent for preventing or treating antipsychotic medication-induced metabolic syndrome.

27. The method of claim 3, wherein the compound of Formula I is administered to the subject as the sole therapeutic agent for preventing or treating antipsychotic medication-induced metabolic syndrome.

28. The method of claim 4, wherein the compound of Formula II is administered to the subject as the sole therapeutic agent for preventing or treating antipsychotic medication-induced metabolic syndrome.

29. The method of claim 5, wherein the compound of Formula I is administered to the subject as the sole therapeutic agent for preventing or treating antipsychotic medication-induced metabolic syndrome.

30. The method of claim 6, wherein the compound of Formula II is administered to the subject as the sole therapeutic agent for preventing or treating antipsychotic medication-induced metabolic syndrome.

31. The pharmaceutical composition of claim 12, wherein the compound of Formula I or Formula II is the sole therapeutic agent for preventing or treating antipsychotic medication-induced metabolic syndrome.

* * * * *